US012744887B2

(12) United States Patent
Wang et al.

(10) Patent No.: US 12,744,887 B2
(45) Date of Patent: Sep. 22, 2026

(54) DISPLACEMENT VECTOR PREDICTION METHOD AND APPARATUS IN VIDEO ENCODING AND DECODING AND DEVICE

(71) Applicant: TENCENT TECHNOLOGY (SHENZHEN) COMPANY LIMITED, Shenzhen (CN)

(72) Inventors: Yingbin Wang, Shenzhen (CN); Xiaozhong Xu, State College, PA (US); Shan Liu, San Jose, CA (US)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 12 days.

(21) Appl. No.: 18/891,078

(22) Filed: Sep. 20, 2024

(65) Prior Publication Data

US 2025/0016307 A1 Jan. 9, 2025

Related U.S. Application Data

(63) Continuation of application No. 17/712,340, filed on Apr. 4, 2022, now Pat. No. 12,126,792, which is a (Continued)

(30) Foreign Application Priority Data

May 22, 2020 (CN) ........................ 202010442257.8

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/182* (2014.11)

(58) Field of Classification Search
CPC ........................... H04N 19/105; H04N 19/159
See application file for complete search history.

(56) References Cited

U.S. PATENT DOCUMENTS 10,356,438 B2 * 7/2019 Chuang ................ H04N 19/593
10,812,791 B2 * 10/2020 Chien .................. H04N 19/105
(Continued)

FOREIGN PATENT DOCUMENTS

CN 106576171 A 4/2017
CN 110460859 A 11/2019
(Continued)

OTHER PUBLICATIONS

International Search Report with English translation and Written Opinion regarding PCT/CN2021/085697 dated Jul. 5, 2021,10 pages.

(Continued)

*Primary Examiner* — Irfan Habib
(74) *Attorney, Agent, or Firm* — Crowell & Moring LLP

(57) ABSTRACT

This application provides a displacement vector prediction method and apparatus in video encoding/decoding and a device and relates to the field of video codec technologies. In this application, candidate displacement vectors are constructed by combining displacement vectors related to a plurality of prediction modes, and then a predicted displacement vector of a current unit is derived from the candidate displacement vectors. Information about an encoded/decoded unit having a same prediction mode as the current unit can be used and information about an encoded/decoded unit having different prediction modes from the current unit is also allowed to be combined to derive the predicted displacement vector of the current unit, so that the candidate displacement vector has a higher possibility to be selected as
(Continued)

the predicted displacement vector, thereby improving the encoding performance of the displacement vector.

20 Claims, 11 Drawing Sheets

Related U.S. Application Data continuation of application No. PCT/CN2021/085697, filed on Apr. 6, 2021.

(51) Int. Cl.
*H04N 19/176* (2014.01)
*H04N 19/182* (2014.01)

(56) References Cited

U.S. PATENT DOCUMENTS 10,958,904 B2 * 3/2021 Xu ........................ H04N 19/105
11,095,915 B2 * 8/2021 Han ...................... H04N 19/134
11,109,036 B2 * 8/2021 Li ......................... H04N 19/159
11,140,412 B2 * 10/2021 Liu ...................... H04N 19/184
11,284,103 B2 * 3/2022 Zhu ........................ H04N 19/52
11,425,407 B2 * 8/2022 Chen ...................... H04N 19/46
11,451,824 B2 * 9/2022 Esenlik ................ H04N 19/563
11,483,552 B2 * 10/2022 Liu ...................... H04N 19/176
11,496,731 B2 * 11/2022 Xu ....................... H04N 19/593
11,509,915 B2 * 11/2022 Zhang .................. H04N 19/107
11,595,678 B2 * 2/2023 Xu ........................ H04N 19/196
11,601,642 B2 * 3/2023 Xu ........................ H04N 19/105
11,729,379 B2 * 8/2023 Xu ........................ H04N 19/105
341/51
11,736,692 B2 * 8/2023 Jeong ..................... H04N 19/91
375/240.16
12,058,327 B2 * 8/2024 Xu ......................... H04N 19/13
12,126,792 B2 * 10/2024 Wang ................... H04N 19/593
12,177,419 B2 * 12/2024 Hu ....................... H04N 19/105
12,556,682 B2 * 2/2026 Hu ........................ H04N 19/105
2015/0055703 A1 * 2/2015 Pang ...................... H04N 19/82
375/240.12
2015/0110181 A1 * 4/2015 Saxena ................ H04N 19/147
375/240.12
2016/0057420 A1 * 2/2016 Pang .................... H04N 19/523
375/240.16
2016/0360234 A1 * 12/2016 Tourapis .............. H04N 19/593
2020/0112715 A1 4/2020 Hung et al.
2021/0314585 A1 * 10/2021 Xu .......................... H04N 19/11
2021/0392363 A1 * 12/2021 Xu ....................... H04N 19/196
2022/0182664 A1 * 6/2022 Xu ........................ H04N 19/105
2023/0093129 A1 * 3/2023 Xu ........................ H04N 19/105
2023/0262225 A1 * 8/2023 Liu ....................... H04N 19/105
375/240.12
2023/0362373 A1 * 11/2023 Jeong ................... H04N 19/176
2023/0388485 A1 * 11/2023 Gao ..................... H04N 19/105
2024/0007630 A1 * 1/2024 Xu ........................ H04N 19/119
2024/0031557 A1 * 1/2024 Ruiz Coll ............ H04N 19/105
2024/0031592 A1 * 1/2024 Zhao .................... H04N 19/513
2025/0227291 A1 * 7/2025 Li .......................... H04N 19/56
2026/0101039 A1 * 4/2026 Galpin ................... H04N 19/13

FOREIGN PATENT DOCUMENTS

CN 110876058 A 3/2020
CN 110944190 A 3/2020
CN 111010579 A 4/2020
CN 112055208 A 12/2020
CN 112218092 A 1/2021
CN 114450957 A 5/2022
EP 3183880 A1 6/2017
WO WO2020043206 A1 3/2020
WO WO2021202769 A1 10/2021
WO WO2021252093 A1 12/2021

OTHER PUBLICATIONS

Extended European Search Report regarding EP 21 80 8651 dated Mar. 27, 2023, 17 pages.
Chinese Office Action with English explanation of relevance regarding 202010442257.8 dated Mar. 11, 2023, 14 pages.
Partial Supplementary European Search Report regarding EP 21 80 8651 dated Feb. 21, 2023, 13 pages.
Zhao, Liping et al., "A Universal String Prediction Approach and Its Application in AVS2 Mixed Content Coding Full-text in Chinese," with English abstract, (*Chinese Journal of Computers*), vol. 42. No. 9, Sep. 30, 2019, pp. 2108, 2112.
Chen et al., "Intra Line Copy for HEVC Screen Content Intra-Picture Prediction," IEEE Transactions on Circuits and Systems for Video Technology, Jul. 1, 2017, pp. 1568-157, 12 pages.
Zhao et al., "A Universal String Prediction Approach and Its Application in AVS2 Mixed Content Coding," with English abstract, Chinese Journal of Computers, AVS2, vol. 42 No. 9, Sep. 30, 2019, 14 pages.
Xiaozhong Xu et al., "Overview of Screen Content Coding in Recently Developed Video Coding Standards," Nov. 28, 2020, 11 pages.
Xu (Mediatek) X et al, "Non-CE2: Intra BC merge mode with default candidates," JCT-VC Meeting; Oct. 17, 2014-Oct. 24, 2014, Strasbourg; (Joint Collaborative Team on Video Coding of ISO/IEC JTC1/SC29/WG11 and ITU-T SG.16 ), No. JCTVC-S0123, Oct. 16, 2014, 4 pages.
Onno (Canon) P et al., "AhG5: On the displacement vector prediction scheme for Intra Block Copy," JCT-VC MEETING; Mar. 27, 2014-Apr. 4, 2014. Valencia, (Joint Collaborative Team on Video Coding of ISO/IEC JTC1/SC29/WG11 and ITU-T SG.16 ), No. JCTVC-Q0062, Mar. 29, 2014, 6 pages.
"AVS3—Part 2: Video," DVB, Digital Video Broadcasting, C/O EBU-17A Ancienne Route—CH-1218 Grand Saconnex, Geneva, Switzerland, Mar. 24, 2021, 403 pages.
European Office Action issued in European Application No. 21 808 651.0 dated Dec. 22, 2025 (8 pages).
Chinese-language Office Action issued in Chinese Application No. 202311371060.X dated May 20, 2026 with English translation (8 pages).

* cited by examiner (a) space domain (b) time domain

FG. 5

DISPLACEMENT VECTOR PREDICTION METHOD AND APPARATUS IN VIDEO ENCODING AND DECODING AND DEVICE

RELATED APPLICATION

This application is a continuation application of U.S. patent application Ser. No. 17/712,340, filed on Apr. 4, 2022, which is incorporated herein by reference in its entirety. The U.S. patent application Ser. No. 17/712,340 is a continuation application of PCT Patent Application No. PCT/CN2021/085697, filed on Apr. 6, 2021, which claims priority to Chinese Patent Application No. 202010442257.8, filed on May 22, 2020, both of which are incorporated herein by reference in their entireties.

FIELD OF THE TECHNOLOGY

Embodiments of this application relate to the field of video codec technologies, and in particular, to a displacement vector prediction method and apparatus in video encoding and decoding and a device.

BACKGROUND OF THE DISCLOSURE

In current video encoding and decoding standards such as a versatile video coding (VVC) standard and an audio video coding standard 3 (AVS3), displacement vector prediction technologies such as inter prediction and intra block copy prediction are introduced. However, an IBC prediction mode is used as an example, a history-based block vector prediction (HBVP) list is constructed based on a block vector (BV) of a historical block, a class-based block vector prediction (CBVP) list is derived from the HBVP list, and a block vector predictor (BVP) of a current block is derived from the CBVP list.

The existing displacement vector prediction method is not conducive to improving the encoding performance of a displacement vector.

The present disclosure describes various embodiments for displacement vector prediction method in video coding and/or decoding, addressing at least one of the problems/issues discussed above, increasing video coding/decoding efficiency and improving video coding/decoding performance, and thus improving the technical field of multimedium compressing/coding/transmitting.

SUMMARY

Embodiments of this application provide a displacement vector prediction method and apparatus in video encoding and decoding and a device, which can construct candidate displacement vectors in combination with displacement vectors related to a plurality of prediction modes and then derive a predicted displacement vector of a current unit from the candidate displacement vectors, to improve the encoding performance of the displacement vector. The technical solutions are as follows.

The present disclosure describes a method for displacement vector prediction in video decoding. The method includes obtaining, by a device, at least one candidate displacement vector, the at least one candidate displacement vector comprising displacement vectors related to at least two prediction modes; deriving, by the device, a predicted displacement vector of a current unit from the at least one candidate displacement vector; and decoding, by the device, the current unit based on the predicted displacement vector. The device includes a memory storing instructions and a processor in communication with the memory.

The present disclosure describes a method for displacement vector prediction in video decoding. The method includes obtaining at least one candidate displacement vector, the at least one candidate displacement vector comprising displacement vectors related to at least two prediction modes; deriving a predicted displacement vector of a current unit from the at least one candidate displacement vector; and decoding the current unit based on the predicted displacement vector.

The present disclosure describes an apparatus for displacement vector prediction in video decoding. The apparatus includes: a memory storing instructions; and a processor in communication with the memory. When the processor executes the instructions, the processor is configured to cause the apparatus to perform: obtaining at least one candidate displacement vector, the at least one candidate displacement vector comprising displacement vectors related to at least two prediction modes; deriving a predicted displacement vector of a current unit from the at least one candidate displacement vector; and decoding the current unit based on the predicted displacement vector.

The present disclosure describes a non-transitory computer-readable storage medium, storing computer-readable instructions. The computer-readable instructions, when executed by a processor, are configured to cause the processor to perform: obtaining at least one candidate displacement vector, the at least one candidate displacement vector comprising displacement vectors related to at least two prediction modes; deriving a predicted displacement vector of a current unit from the at least one candidate displacement vector; and decoding the current unit based on the predicted displacement vector.

According to an aspect, an embodiment of this application provides a displacement vector prediction method in video encoding and decoding, the method including:

obtaining a candidate displacement vector, the candidate displacement vector including displacement vectors related to at least two prediction modes;

deriving a predicted displacement vector of a current unit from the candidate displacement vector; and encoding or decoding the current unit based on the predicted displacement vector.

According to an aspect, an embodiment of this application provides a string vector prediction method in video encoding and decoding, the method including:

obtaining a candidate displacement vector;

deriving a predicted displacement vector of a current string from the candidate displacement vector; and encoding or decoding the current string based on the predicted displacement vector.

According to an aspect, an embodiment of this application provides a displacement vector prediction apparatus in video encoding and decoding, the apparatus including:

a candidate vector obtaining module, configured to obtain a candidate displacement vector, the candidate displacement vector including displacement vectors related to at least two prediction modes;

a predicted vector deriving module, configured to derive a predicted displacement vector of a current unit from the candidate displacement vector; and an encoding or decoding module, configured to encode or decode the current unit based on the predicted displacement vector.

According to an aspect, an embodiment of this application provides a string vector prediction apparatus in video encoding and decoding, the apparatus including:

- a candidate vector obtaining module, configured to obtain a candidate displacement vector;
- a predicted vector deriving module, configured to derive a predicted displacement vector of a current string from the candidate displacement vector; and
- an encoding or decoding module, configured to encode or decode the current string based on the predicted displacement vector.

According to an aspect, an embodiment of this application provides a computer device, including a processor and a memory, the memory storing at least one instruction, the at least one instruction being loaded and executed by the processor to implement the displacement vector prediction method in video encoding and decoding or implement the string vector prediction method in video encoding and decoding.

According to an aspect, an embodiment of this application provides a computer-readable storage medium, storing at least one instruction, the at least one instruction being loaded and executed by a processor to implement the displacement vector prediction method in video encoding and decoding or implement the string vector prediction method in video encoding and decoding.

According to an aspect, an embodiment of this application provides a computer program product, the computer program product, when executed by a processor, being used for implementing the displacement vector prediction method in video encoding and decoding or implementing the string vector prediction method in video encoding and decoding.

DESCRIPTION OF EMBODIMENTS

Figure 1:
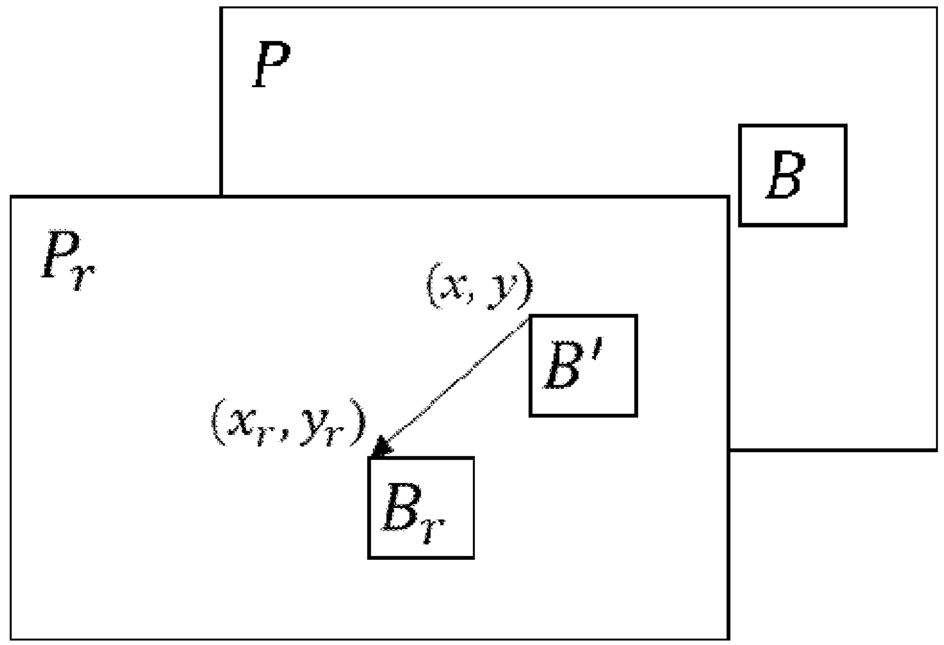
FIG. 1 is a schematic diagram of an inter prediction mode according to an embodiment of this application.

To make objectives, technical solutions, and advantages of this application clearer, the following further describes implementations of this application in detail with reference to the accompanying drawings.

Some mainstream video coding standards such as a high efficiency video coding (HEVC) standard, a VVC standard, and an AVS3 standard adopt a block-based hybrid coding framework. Original video data is divided into a series of encoding blocks according to the video coding standards, and the video data is compressed according to video encoding methods such as prediction, transform, and entropy coding. Motion compensation is a type of prediction method commonly used in video encoding. Based on redundancy characteristics of video content in time domain or space domain, motion compensation derives a predicted value of a current encoding block based on an encoded block. The type of prediction method includes: inter prediction, intra block copy prediction, intra string copy prediction, and the like. In a specific encoding implementation, the prediction methods may be used alone or in combination. For encoding blocks using the prediction methods, it is usually necessary to explicitly or implicitly encode one or more two-dimensional displacement vectors, indicating a displacement of a current block (or a co-located block of the current block) relative to one or more reference blocks of the current block.

In different prediction modes or in different encoding implementations, the displacement vector may have different names, and in this specification, the displacement vector is uniformly described in the following manner: (1) a displacement vector in an inter prediction mode is referred to as a motion vector (MV); (2) a displacement vector in an intra block copy (IBC) prediction mode is referred to as a block vector (BV); and (3) a displacement vector in an intra string copy (ISC) prediction mode is referred to as a string vector (SV). The intra string copy is also referred to as "string prediction", "string matching", or the like.

The MV refers to a displacement vector used for the inter prediction mode, which points to a reference image from a current image, and a value of the MV is a coordinate offset between a current block and a reference block. The current block and the reference block are in two different images. In some embodiments, the coordinate offset between the blocks is an offset between coordinates of a pixel at the center of the block and coordinates of a pixel at the center of the other block, In the inter prediction mode, motion vector prediction may be introduced. A motion vector of the current block is predicted, to obtain a predicted motion vector corresponding to the current block, and encoding transmission is performed on a difference between the predicted motion vector corresponding to the current block and an actual motion vector. Compared with a manner of directly performing encoding transmission on the actual motion vector corresponding to the current block, this manner is favorable for reducing bit overheads. In the embodiments of this application, the predicted motion vector refers to a predicted value of the motion vector of the current block obtained by using a motion vector prediction technology.

The BV refers to a displacement vector in the IBC prediction mode, and a value of the BV is a coordinate offset between a current block and a reference block. Both the current block and the reference block are in a current image. In the IBC prediction mode, block vector prediction may be introduced. A block vector of the current block is predicted, to obtain a predicted block vector corresponding to the current block, and encoding transmission is performed on a difference between the predicted block vector corresponding to the current block and an actual block vector. Compared with a manner of directly performing encoding transmission on the actual block vector corresponding to the current block, this manner is favorable for reducing bit overheads. In the embodiments of this application, the predicted block vector refers to a predicted value of the block vector of the current block obtained by using a block vector prediction technology.

The SV refers to a displacement vector in the ISC prediction mode, and a value of the SV is a coordinate offset between a current string and a reference string. Both the current string and the reference string are in a current image. In the ISC prediction mode, string vector prediction may be introduced. A string vector of the current string is predicted, to obtain a predicted string vector corresponding to the current string, and encoding transmission is performed on a difference between the predicted string vector corresponding to the current string and an actual string vector. Compared with a manner of directly performing encoding transmission on the actual string vector corresponding to the current string, this manner is favorable for reducing bit overheads. In the embodiments of this application, the predicted string vector refers to a predicted value of the string vector of the current string obtained by using a string vector prediction technology.

The following describes several different prediction modes.

1. Inter Prediction Mode

As shown in FIG. 1, video encoding is used as an example, inter prediction is to predict a pixel in a current image by using correlation of time domain of a video and using a pixel in an adjacent encoded image, so that the time domain of the video is not redundant, and bits of encoded residual data can be effectively reduced. P is a current image, Pr is a reference image, B is a current to-be-encoded block, and Br is a reference block of B in Pr. B' has a same coordinate position as B in an image. Coordinates of Br are (xr, yr), and coordinates of B' are (x, y). A displacement between the current to-be-encoded block and the reference block thereof is referred to as a motion vector (MV), that is, $$MV = (xr - x, \text{yr} - y).$$

Considering relatively strong correlation between adjacent blocks in time domain or space domain, bits required to encode the MV is further reduced by using an MV prediction technology. In the H.265/HEVC standard, inter prediction includes two MV prediction technologies of merge and advanced motion vector prediction (AMVP).

In the merge mode, an MV candidate list is established for a current prediction unit (PU), and there are five candidate MVs (and reference images corresponding to the candidate MVs) in the MV candidate list. The five candidate MVs are traversed, and one MV with a minimum rate-distortion cost is selected as an optimal MV. If a codec establishes a candidate list in a same manner, an encoder needs to transmit an index of only an optimal MV in the candidate list. The MV prediction technology in the HEVC standard also has a skip mode, which is a special case of the merge mode. After the optimal MV is found in the merge mode, if a current block is basically the same as a reference block, no residual data needs to be transmitted, and only an index of an MV and a skip flag need to be transmitted.

Figure 2:
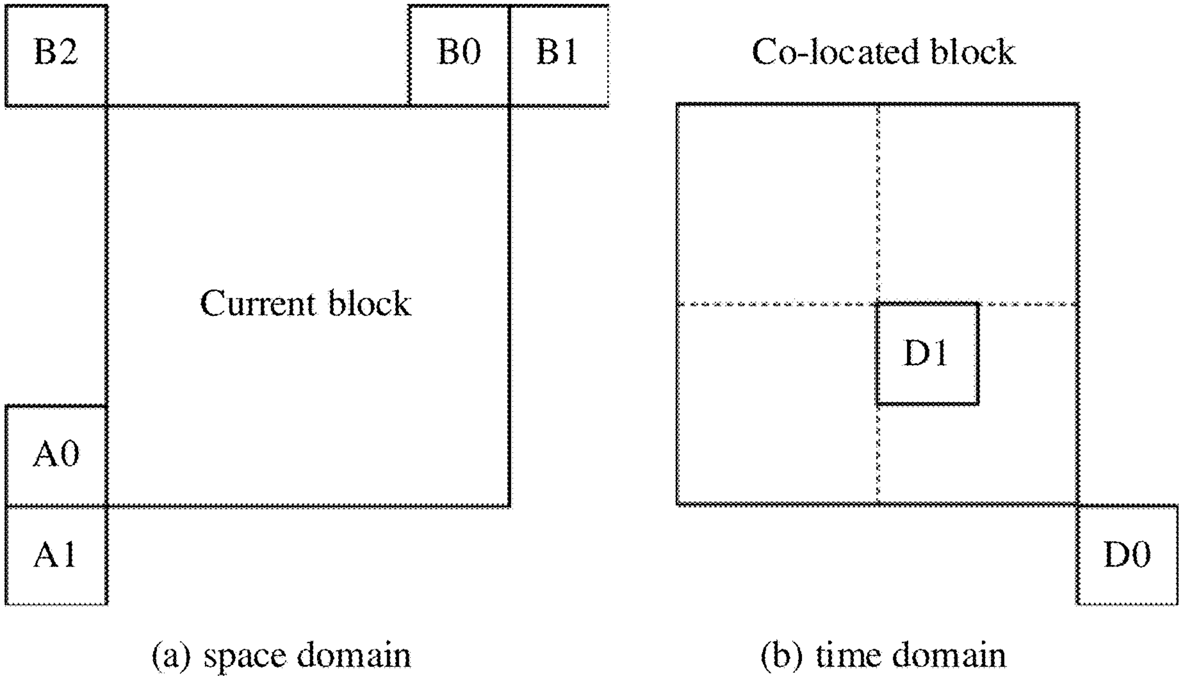
FIG. 2 is a schematic diagram of a candidate motion vector according to an embodiment of this application.

The MV candidate list established in the merge mode includes two cases of space domain and time domain. A B slice further includes a manner of combining lists. In the space domain, at most four candidate MVs are provided, and the four candidate MVs are established shown in a part (a) in FIG. 2. In the space domain, the list is established according to a sequence of A1→B1→B0→A0→B2, B2 being a substitute, that is, when one or more of A1, B1, B0, or A0 do not exist, motion information of B2 needs to be used. In the time domain, at most one candidate MV is provided, and the candidate MV is established shown in a part (b) in FIG. 2 and is obtained by scaling an MV of a co-located PU according to the following formula:

$$curMV = td * colMV/tb,$$

where curMV represents an MV of a current PU, colMV represents an MV of a co-located PU, td represents a distance between a current image and a reference image, and tb represents a distance between a co-located image and the reference image. If a PU at a DO position on a co-located block is unavailable, the PU at the DO position is replaced with a co-located PU at a DI position. Because a PU in the B slice has two MVs, an MV candidate list of the PU also needs to provide two motion vector predictors (MVPs). In the HEVC standard, the first four candidate MVs in the MV candidate list are combined in pairs, to generate a combined list for the B slice.

Similarly, an AMVP mode is to first establish an MV candidate list for a current PU by using correlation between MVs of adjacent blocks in space domain and time domain. Different from the merge mode, in the AMVP mode, an optimal predicted MV is selected from the MV candidate list, and differential encoding is performed on the optimal predicted MV and an optimal MV of a current to-be-encoded block obtained through motion search, that is, MVD=MV-MVP is encoded, the MVD being a motion vector difference. By establishing a same list, a decoder side can calculate an MV of a current decoding block by requiring only sequence numbers of an MVD and an MVP in the list. In the AMVP mode, the MV candidate list also includes two cases of space domain and time domain, and a difference lies in only two MVs in the MV candidate list in the AMVP mode.

History based motion vector prediction (HMVP) is a new MV prediction technology adopted in the H.266/VCC standard. The HMVP is a historical information-based motion vector prediction method. Motion information of a historical encoding block is stored in an HMVP list and is used as an MVP of a current coding unit (CU). In the H.266/VCC standard, an HMVP is added to the candidate list of the merge mode and is after a space domain MVP and a time domain MVP. By using the HMVP technology, motion information of a previous encoding block is stored by a first input first output (FIFO) queue. If stored candidate motion information is the same as just encoded motion information, the repeated candidate motion information is first removed, and then all HMVP candidates are shifted forward and motion information of a current coding unit is added to a tail of the FIFO queue. If the motion information of the current coding unit is different from motion information of any candidate, the latest motion information is added to the tail of the FIFO queue. When new motion information is added to the HMVP list, and if the HMVP list reaches a maximum length, a first candidate in the FIFO queue is removed, and then the latest motion information is added to the tail of the FIFO queue. The HMVP list is reset (clear) when there is a new coding tree unit (CTU) row. In the H.266/VVC standard, a size S of the HMVP list is set to 6. To reduce a quantity of redundancy check operations, the following simplifications are introduced.

1. A quantity of HMVP candidates used for generating a merge list is set to (N≥4)?M:(8-N), where N represents a quantity of existing candidates in the merge list, and M represents a quantity of available HMVP candidates in the merge list.

2. Once a length of the available merge list reaches a maximum allowed length minus 1, a construction process of a merge candidate list of the HMVP is ended.

2. IBC Prediction Mode

Figure 3:
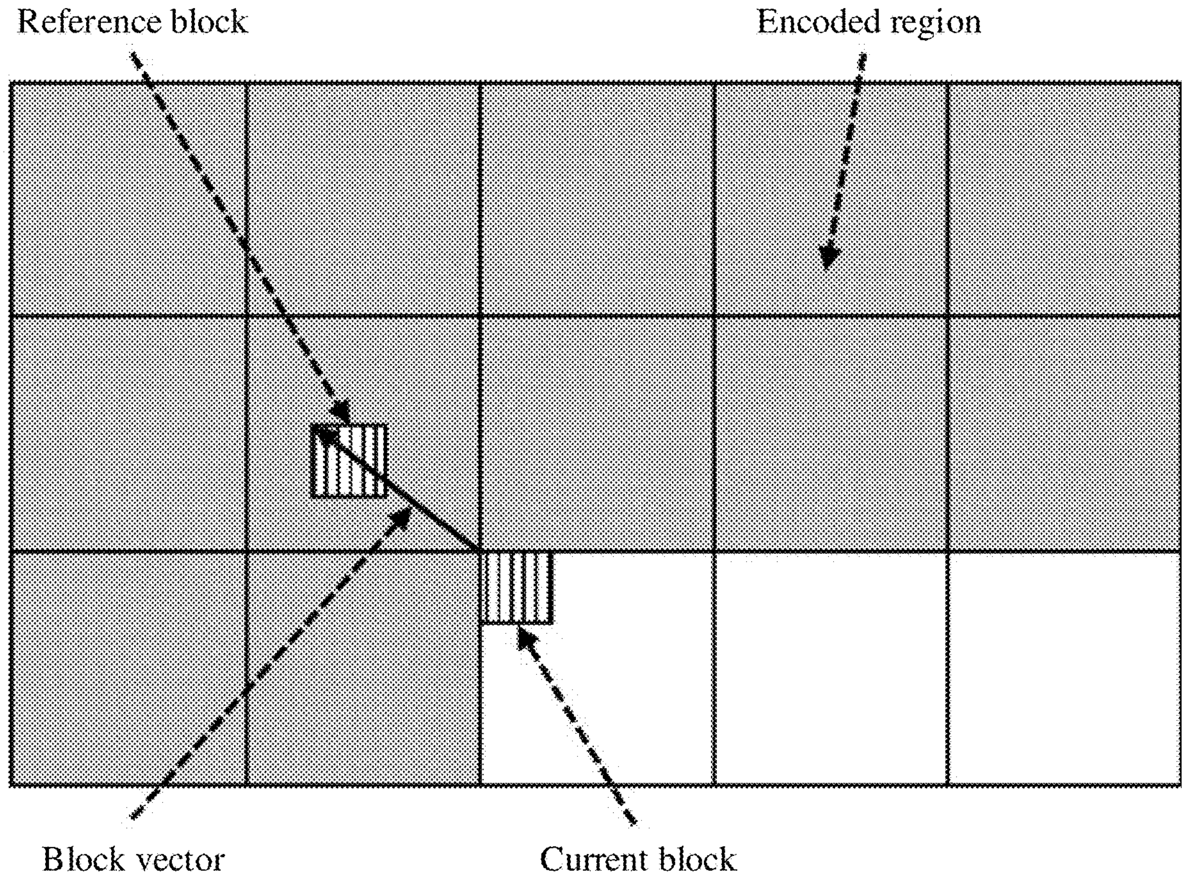
FIG. 3 is a schematic diagram of an intra block copy mode according to an embodiment of this application.

IBC is an intra-frame encoding tool adopted in a screen content coding (SCC) extension to HEVC, which significantly improves the encoding efficiency of screen content. In the AVS3 standard and the VVC standard, the IBC technology is also adopted for improving the performance of the screen content coding. The IBC is to predict a pixel of a current to-be-encoded block by using correlation of a screen content video in a space and using a pixel in an encoded image on a current image, which can effectively reduce bits required for encoding the pixel. An IBC prediction process includes: constructing a history-based block vector prediction (HBVP) list based on a block vector (BV) of a historical block, deriving a class-based block vector prediction (CBVP) list from the HBVP list, and deriving a block vector predictor (BVP) of a current block from the CBVP list. As shown in FIG. 3, in the IBC, a displacement between a current block and a reference block thereof is referred to as a block vector (BV). In the H.266/VVC standard, a BV prediction technology similar to the inter prediction is adopted, to further reduce bits required for encoding the BV.

In the AVS3 standard, class-based block vector prediction (CBVP) is adopted. Similar to HMVP, in this method, information about a historical IBC encoding block is first stored by using an HBVP list, which further records information such as a position and a size of the historical encoding block in addition to recording BV information of the historical encoding block. For a current encoding block, candidate BVs in the HBVP list are classified according to the following conditions:

Class 0: an area of a historical encoding block is greater than or equal to 64 pixels;

Class 1: a frequency of a BV is greater than or equal to 2;

Class 2: coordinates of an upper left corner of the historical encoding block are located at the left of coordinates of an upper left corner of the current block;

Class 3: the coordinates of the upper left corner of the historical encoding block are located at an upper side of the coordinates of the upper left corner of the current block;

Class 4: the coordinates of the upper left corner of the historical encoding block are located at the upper left of the coordinates of the upper left corner of the current block;

Class 5: the coordinates of the upper left corner of the historical encoding block are located at the upper right of the coordinates of the upper left corner of the current block; and Class 6: the coordinates of the upper left corner of the historical encoding block are located at the lower left of the coordinates of the upper left corner of the current block.

Instances in each class are sorted in an order reverse to an encoding sequence (when an encoding sequence is closer to a current block, it indicates that an instance ranks higher), and a BV corresponding to a first historical encoding block is a candidate BV corresponding to the class. Subsequently, a candidate BV corresponding to each class is added to the CBVP list according to a sequence from the class 0 to the class 6. When a new BV is added to the CBVP list, whether a repeated BV has existed in the CBVP list needs to be checked. Only when there is no repeated BV, the BV is added to the CBVP list. An encoder side selects an optional candidate BV from the CBVP lists as a BVP and encodes an index in a bit stream, indicating an index of a class corresponding to the optimal candidate BV in the CBVP list. A decoder side decodes the BVP from the CBVP list according to the index.

3. ISC Prediction Mode

Figure 4:
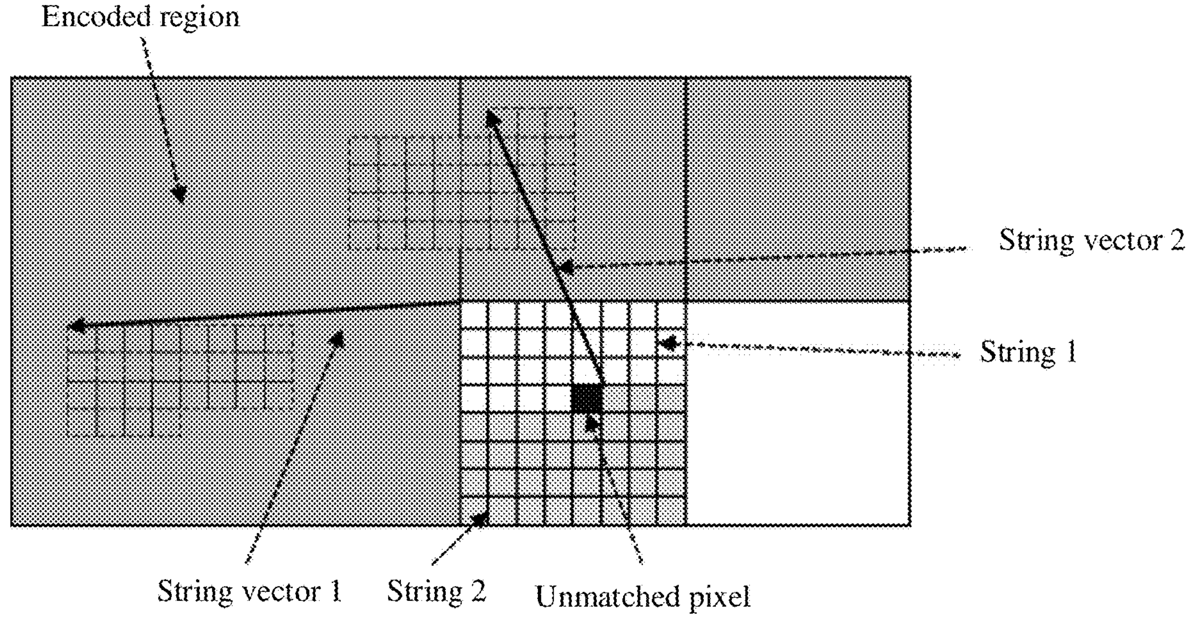
FIG. 4 is a schematic diagram of an intra string copy mode according to an embodiment of this application.

An encoding block is divided into a series of pixel strings or unmatched pixels by using an ISC technology according to a scanning sequence (raster scanning, round-trip scanning, Zig-Zag scanning, or the like). Similar to IBC, a reference string of a same shape is found in an encoded region of a current image for each string, and a predicted value of a current string is derived. A residual between a pixel value and the predicted value of the current string is encoded, instead of directly encoding the pixel value, thereby effectively reducing bits. FIG. 4 is a schematic diagram of intra string copy. A dark region is an encoded region, 28 white pixels are a string 1, 35 light-colored pixels are a string 2, and one black pixel represents an unmatched pixel. A displacement between the string 1 and a reference string thereof is a string vector 1 in FIG. 4. A displacement between the string 2 and a reference string thereof is a string vector 2 in FIG. 4.

In the intra string copy technology, a string vector (SV), a string length, and a flag indicating whether there is a matched string corresponding to each string in a current encoding block need to be encoded. The SV represents a displacement between a to-be-encoded string and a reference string thereof. The string length represents a quantity of pixels included in the string. In different implementations, the string length is encoded in a plurality of manners. Several examples are provided below (some examples may be used in combination): (1) a length of an encoding string is directly encoded in a bit stream; (2) a quantity of to-be-processed pixels after the string is processed through encoding in the bit stream, the decoder side performs decoding according to a size N of a current block and a quantity N1 of processed pixels, to obtain a quantity N2 of to-be-processed pixels, and obtains a length of the current string through calculation, that is, L=N-N1-N2; and (3) a flag is encoded to indicate whether the string is a last string in a bit stream, and if the string is the last string, the length L of the current string is obtained through calculation according to the size N of the current block and the quantity N1 of processed pixels, that is, L=N−N1. If no corresponding reference pixel is found in a referable region for a pixel, a pixel value of an unmatched pixel is directly encoded.

The displacement vector prediction technology in inter prediction and intra block copy can also be combined with similar prediction technology in intra string copy to improve the encoding performance of the SV. In the related art, the displacement vector (including an MV, a BV, and an SV) prediction technology used by inter prediction, intra block copy, and intra string copy technology utilizes only information about encoding blocks of a same mode, but ignores correlation of displacement vectors in different modes. The BV prediction technology in the VVC/AVS3 standard is used as an example, the related BV prediction technology is to construct an HBVP list by using only a BV in an IBC encoding block, and not update the HBVP list by using displacement vector information of the inter-frame prediction or the intra string copy encoding block. In particular, reference regions of the IBC mode and the ISC mode are all encoded regions on a current image, and displacement vectors thereof have relatively high correlation.

This application provides a displacement vector prediction method in video encoding and decoding. Candidate displacement vectors are constructed by combining displacement vectors related to a plurality of prediction modes, and then a predicted displacement vector of a current unit is derived from the candidate displacement vectors. This solution can not only use information about an encoded/decoded unit having a same prediction mode as the current unit but also allows to be combined with information about an encoded/decoded unit having different prediction modes from the current unit to derive the predicted displacement vector of the current unit, so that the candidate displacement vector has a higher possibility to be selected as the predicted displacement vector, thereby improving the encoding performance of the displacement vector.

Figure 5:
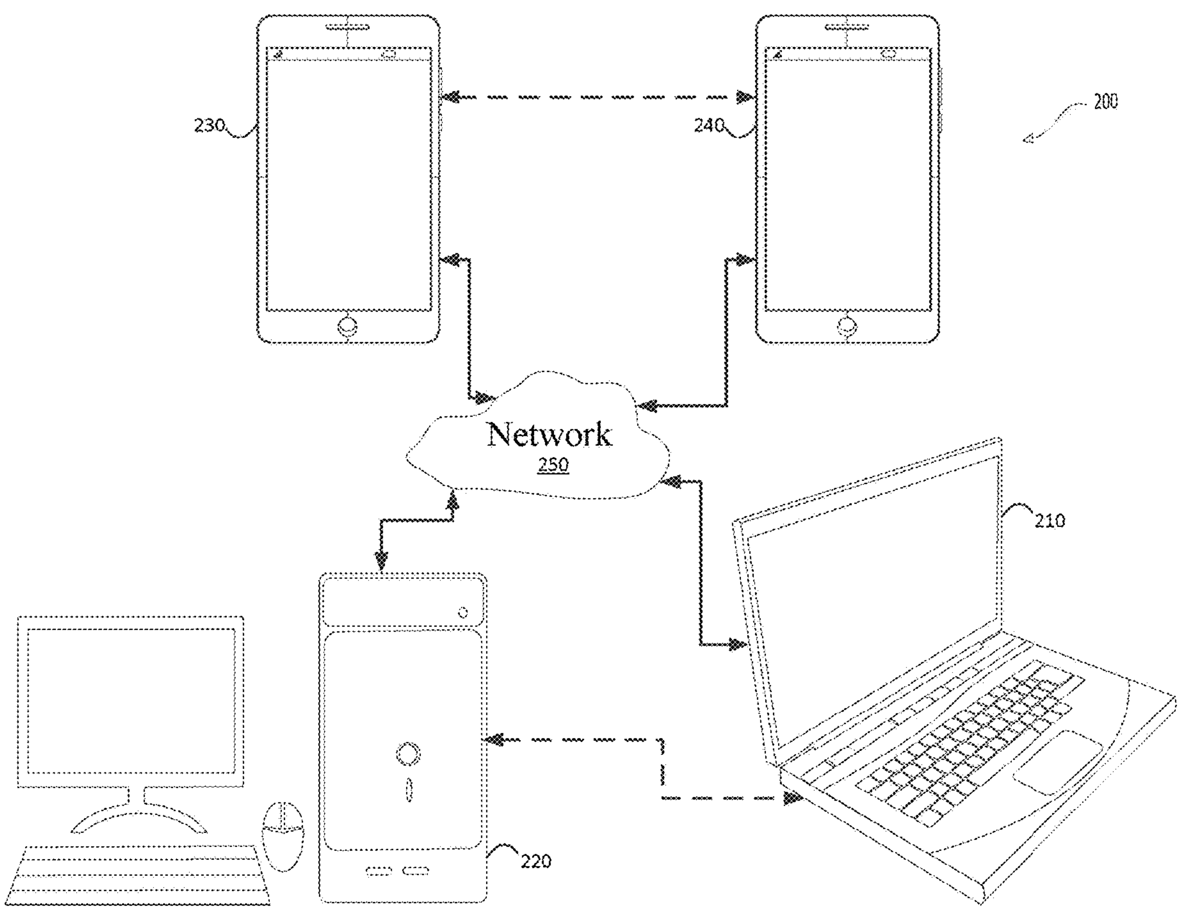
FIG. 5 is a block diagram of a simplified communication system according to an embodiment of this application.

FIG. 5 is a block diagram of a simplified communication system 200 according to an embodiment of this application. The communication system 200 includes a plurality of electronic devices, and the electronic devices may communicate with each other through, for example, a network 250. For example, the communication system 200 includes a first electronic device 210 and a second electronic device 220 connected to each other through the network 250. In various embodiments of FIG. 5, the first electronic device 210 and the second electronic device 220 perform one-way data transmission. For example, the first electronic device 210 may encode video data (for example, a video picture stream acquired by the first electronic device 210) and transmit the video data to the second electronic device 220 through the network 250. The encoded video data is transmitted in the form of one or more video bitstreams. The second electronic device 220 may receive the encoded video data from the network 250, decode the encoded video data, to restore the video data, and perform video playback on the restored video data. The one-way data transmission is relatively common in applications such as a media service.

In another embodiment, the communication system 200 includes a third electronic device 230 and a fourth electronic device 240 that perform two-way transmission on encoded video data. The two-way transmission may occur, for example, during a video conference. For two-way data transmission, each device of the third electronic device 230 and the fourth electronic device 240 may encode video data (for example, a video picture stream acquired by the device), and transmit the video data to the other device of the third electronic device 230 and the fourth electronic device 240 through the network 250. Each device of the third electronic device 230 and the fourth electronic device 240 may further receive the encoded video data transmitted by the other device of the third electronic device 230 and the fourth electronic device 240, decode the encoded video data, to restore the video data, and display video picture in an accessible display apparatus according to the restored video data.

In various embodiments of FIG. 5, the first electronic device 210, the second electronic device 220, the third electronic device 230, and the fourth electronic device 240 may be computer devices such as a server, a personal computer, and a smart phone. However, the principles disclosed in this application may not be limited herein. Various embodiments of this application is applicable to a personal computer (PC), a mobile phone, a tablet computer, a media player, and/or a dedicated video conference device. The network 250 is a network for transmitting the encoded video data among the first electronic device 210, the second electronic device 220, the third electronic device 230, and the fourth electronic device 240 and includes, for example, a wired and/or wireless communication network. The communication network 250 may exchange data in a circuit switching and/or packet switching channel. The network may include a telecommunication network, a local area network, a wide area network, and/or the Internet. For the purpose of this application, unless explained below, the architecture and topology of the network 250 may be immaterial to the operations disclosed in this application.

Figure 6:
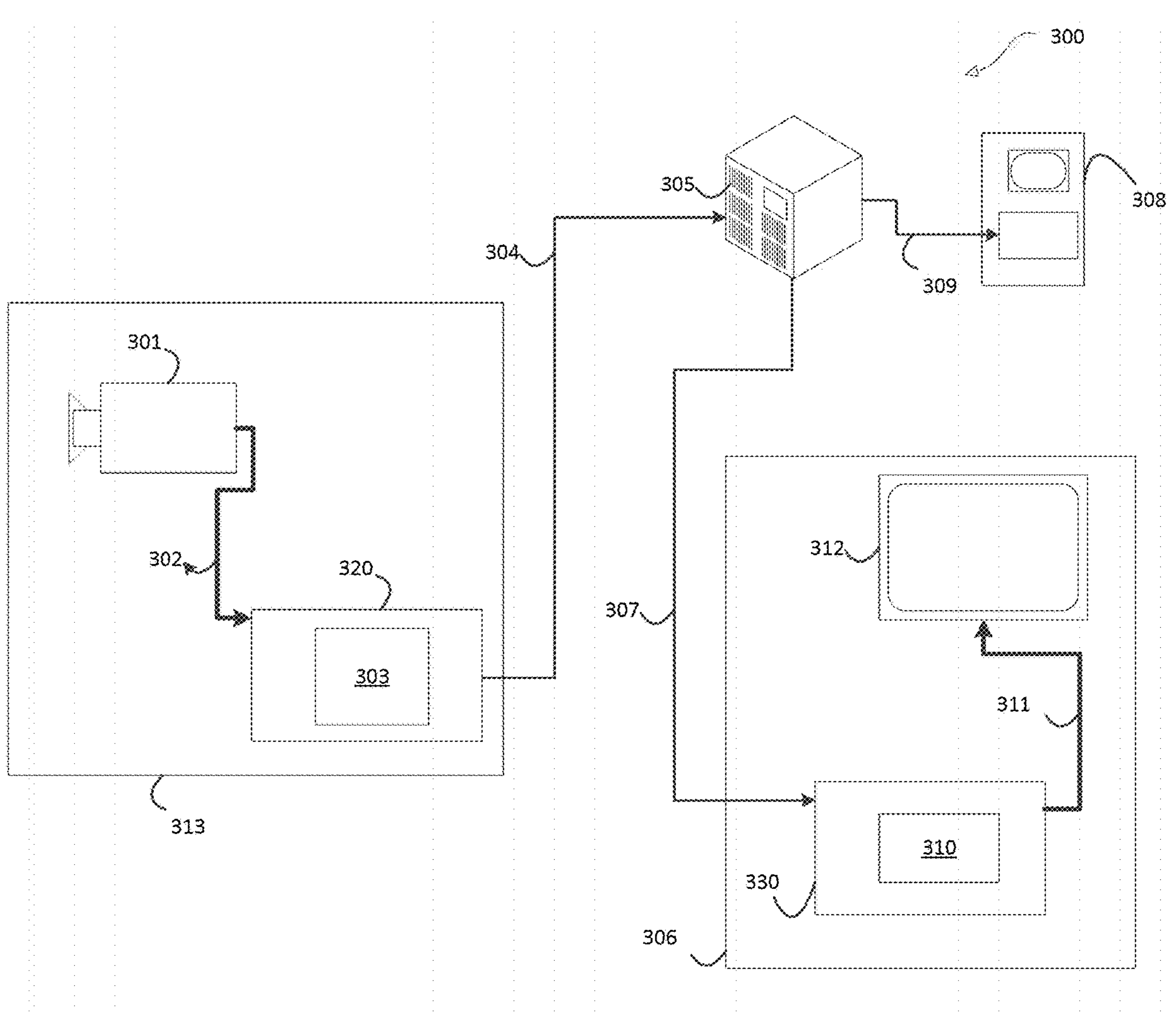
FIG. 6 is a schematic diagram of placement manners of a video encoder and a video decoder in a streaming transmission environment according to an example of this application.

As an embodiment, FIG. 6 shows placement manners of a video encoder and a video decoder in a streaming transmission environment. The subject disclosed in this application is equally applicable to other applications supporting a video, including, for example, a video conference and a digital television (TV), and a compressed video is stored in a digital medium including a compact disc (CD), a digital versatile disc (DVD), a memory stick, and the like.

A streaming transmission system may include an acquisition subsystem 313. The acquisition subsystem 313 may include a video source 301 such as a digital camera or a digital video camera. The video source creates an uncompressed video picture stream 302. In various embodiments, the video picture stream 302 includes samples photographed by the digital camera. Compared with encoded video data 304 (or encoded video bit stream), the video picture stream 302 is a video picture stream depicted by a thick line for emphasizing a high data volume. The video picture stream 302 may be processed by using an electronic apparatus 320. The electronic 320 includes a video encoder 303 coupled to the video source 301. The video encoder 303 may include hardware, software, or a combination of hardware and software, to implement aspects of the disclosed subject described below in detail. Compared with the video picture stream 302, the encoded video data 304 (or the encoded video bit stream 304) is encoded video data 304 (or encoded video bit stream 304) depicted by a thin line for emphasizing a relatively low data volume and may be stored in a streaming transmission server 305 for future use. One or more streaming transmission client subsystems, for example, a client subsystem 306 and a client subsystem 308 in FIG. 6, may access the streaming transmission server 305 to retrieve a copy 307 and a copy 309 of the encoded video data 304. The client subsystem 306 may include, for example, a video decoder 310 in an electronic apparatus 330. The video decoder 310 decodes the transmitted copy 307 of the encoded video data and generates an output video picture stream 311 that can be displayed in a display 312 (for example, a display screen) or another display apparatus (not described). In some streaming transmission systems, encoded video data 304, video data 307, and video data 309 (for example, a video bit stream) may be encoded according to some video encoding/compression standards.

The electronic apparatus 320 and the electronic apparatus 330 may include other components (not shown). For example, the electronic apparatus 320 may include a video decoder (not shown), and the electronic apparatus 330 may further include a video encoder (not shown). The video decoder is configured to decode received encoded video data. The video encoder is configured to encode the video data.

The technical solution provided in various embodiments of this application is applicable to an H.266/VVC standard, an H.265/high efficient video coding (HEVC) standard, an audio video coding standard (AVS) or an AVS 3, or a next generation of video encoding and decoding standard. This is not limited in various embodiments of this application.

Steps in the method provided in the embodiments of this application may be performed by a decoder side device or by an encoder side device. During video decoding and video encoding, displacement vector prediction may be performed by using the technical solution provided in various embodiments of this application. Both the decoder side device and the encoder side device may be computer devices. The computer device refers to an electronic device with data calculation, processing, and storage capabilities, for example, a PC, a mobile phone, a tablet computer, a media player, a dedicated video conference device, or a server.

In addition, the method provided in this application may be used alone or in combination with another method in any sequence. An encoder and a decoder based on the method provided in this application may be implemented by one or more processors or one or more integrated circuits. The technical solution of this application is described below by using several embodiments.

Figure 7:
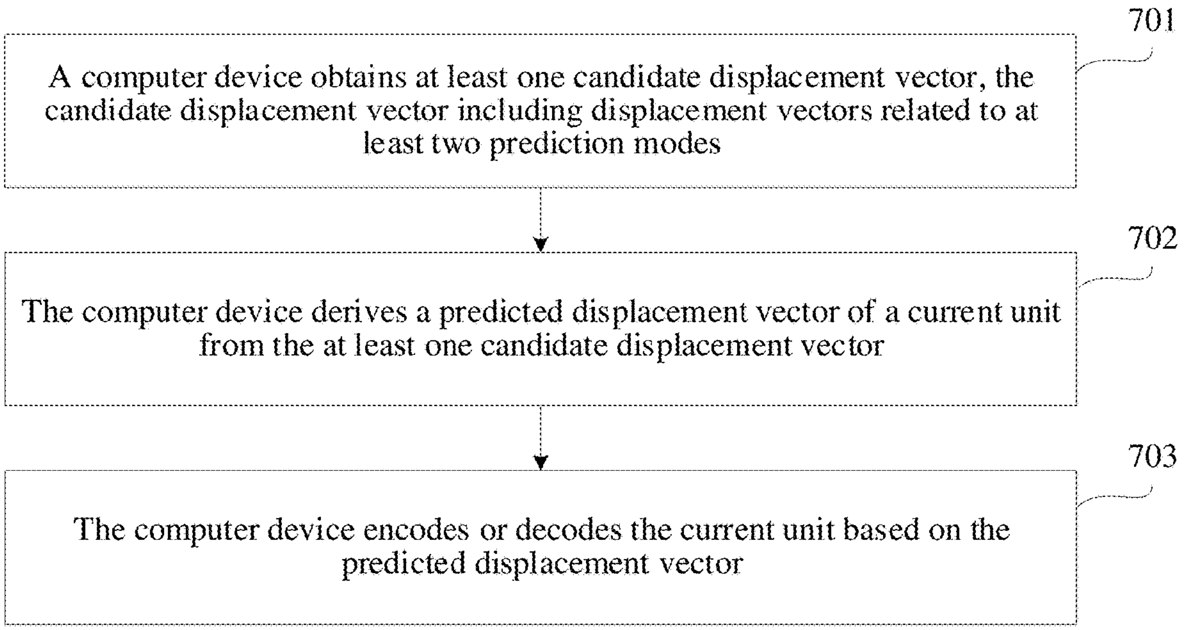
FIG. 7 is a flowchart of a displacement vector prediction method in video encoding and decoding according to an embodiment of this application.

FIG. 7 is a flowchart of a displacement vector prediction method in video encoding and decoding according to an embodiment of this application. For ease of description, the description is provided by merely using a computer device as an execution body of steps. The method may include the following steps (701 to 703).

Step 701. A computer device obtains at least one candidate displacement vector, the candidate displacement vector including displacement vectors related to at least two prediction modes.

The candidate displacement vector can provide a candidate for deriving a predicted displacement vector of a current unit. There may be one or more candidate displacement vectors. For example, there may be one same displacement vector determined based on an IBC prediction mode and an ISC prediction mode. In this case, there is one obtained candidate displacement vector. For an encoding process, the candidate displacement vectors may be displacement vectors of some encoded units. For a decoding process, the candidate displacement vectors may be displacement vectors of some decoded units.

In various embodiments of this application, the current unit is a current to-be-encoded (or to-be-decoded) image unit. The image unit may include one or more pixels and the image unit may be in a block shape or a string shape described above. For an inter prediction mode and the IBC prediction mode, the current unit is also referred to as a current block, which refers to a current to-be-encoded (or to-be-decoded) image block. For the ISC prediction mode, the current unit is also referred to as a current string, which refers to a current to-be-encoded (or to-be-decoded) image string.

In various embodiments of this application, the candidate displacement vector includes displacement vectors related to at least two prediction modes. Optionally, the at least two prediction modes include: the IBC prediction mode and the ISC prediction mode. In this case, the candidate displacement vector may include a displacement vector (that is, a block vector) generated based on the IBC prediction mode and may further include a displacement vector (that is, a string vector) generated based on the ISC prediction mode.

Certainly, in some other embodiments, the at least two prediction modes may include at least two of the following prediction modes: the inter prediction mode, the IBC prediction mode, the ISC prediction mode, or a subsequently introduced new prediction mode. This is not limited in various embodiments of this application.

Step 702. The computer device derives a predicted displacement vector of a current unit from the at least one candidate displacement vector.

In various embodiments of this application, the predicted displacement vector refers to a predicted value of a displacement vector of the current unit obtained by predicting the displacement vector of the current unit based on a displacement vector prediction technology. The "displacement vector" is used for representing a two-dimensional vector of motion information, for example, the MV, the BV, or the SV described above.

Optionally, the computer device constructs a candidate displacement vector list. The candidate displacement vector list is a list used for storing the candidate displacement vector. The candidate displacement vector list may include a plurality of candidate displacement vectors, and each candidate displacement vector corresponds to a corresponding index. Optionally, in addition to including the candidate displacement vector, the candidate displacement vector list may further include corresponding auxiliary information. The auxiliary information is auxiliary information such as size information, position information, a quantity of duplicates, and a prediction mode used for encoding and decoding. The computer device derives the predicted displacement vector of the current unit from the candidate displacement vector list. For example, the computer device selects, by using a displacement vector prediction technology, an optimal candidate displacement vector from the candidate displacement vector list as the predicted displacement vector of the current unit. Optionally, the computer device may derive the predicted displacement vector of the current unit by using a technology similar to the merge mode or the AMVP mode or other displacement vector prediction technologies. The optimal candidate displacement vector may be a candidate displacement vector with a minimum rate-distortion cost.

Step 703. The computer device encodes or decodes the current unit based on the predicted displacement vector.

After the predicted displacement vector of the current unit is derived, for the encoding process, the current unit may be encoded based on the predicted displacement vector. For the decoding process, the current unit may be decoded based on the predicted displacement vector.

The displacement vector prediction technology provided in various embodiments may be referred to as a hybrid vector prediction technology, which combines displacement vectors related to a plurality of prediction modes to construct the candidate displacement vectors.

Optionally, when a prediction mode of the current unit is a stipulated mode, the hybrid vector prediction technology is used. For example, in a case that the prediction mode of the current unit is the IBC prediction mode, the predicted displacement vector of the current unit is derived by using the hybrid vector prediction technology. In another example, in a case that the prediction mode of the current unit is the ISC prediction mode, the predicted displacement vector of the current unit is derived by using the hybrid vector prediction technology. In still another example, in a case that the prediction mode of the current unit is the IBC prediction mode or the ISC prediction mode, the predicted displacement vector of the current unit is derived by using the hybrid vector prediction technology.

Based on the foregoing, according to the technical solution provided in various embodiments of this application, candidate displacement vectors are constructed by combining displacement vectors related to a plurality of prediction modes, and then a predicted displacement vector of a current unit is derived from the candidate displacement vectors. This solution can not only use information about an encoded/decoded unit having a same prediction mode as the current unit but also allows to be combined with information about an encoded/decoded unit having different prediction modes from the current unit to derive the predicted displacement vector of the current unit, so that the candidate displacement vector has a higher possibility to be selected as the predicted displacement vector, thereby improving the encoding performance of the displacement vector.

An embodiment of this application provides several methods for obtaining the candidate displacement vector, which are described below.

In an exemplary embodiment, the candidate displacement vector is obtained by using the following steps:

1. Construct a history-based displacement vector prediction list, the history-based displacement vector prediction list including a displacement vector of a historical unit.
2. Derive the candidate displacement vector from the history-based displacement vector prediction list.

In various embodiments of this application, the historical unit is an encoded (or decoded) image unit. The image unit may include one or more pixels and the image unit may be in a block shape or a string shape. For the inter prediction mode and the IBC prediction mode, the historical unit is also referred to as a historical block, which refers to an encoded (or decoded) image block. For the ISC prediction mode, the historical unit is also referred to as a historical string, which refers to an encoded (or decoded) image string.

Optionally, before a first displacement vector is added to the history-based displacement vector prediction list, a duplicate checking operation is performed on the first displacement vector. The history-based displacement vector prediction list is updated based on a result of the duplicate checking. The first displacement vector may be any to-be-added displacement vector. For example, before the first displacement vector is added to the history-based displacement vector prediction list, duplicate checking and comparison may be performed on the first displacement vector and target displacement vectors. In some embodiments, the target displacement vectors are all displacement vectors in the history-based displacement vector prediction list or some displacement vectors in the history-based displacement vector prediction list. Optionally, duplicate checking and comparison are performed on the first displacement vector and each target displacement vector. When it is found that the first displacement vector is repeated with a target displacement vector, comparison may be stopped, and it is determined that a result of duplicate checking is that there is a duplicate. When it is found that the first displacement vector is not repeated with a target displacement vector, a next target displacement vector is selected for duplicate checking and comparison with the first displacement vector. If duplicate checking and comparison on all the target displacement vectors is completed, and there is no duplicate with the first displacement vector, it is determined that the result of the duplicate checking is that there is no duplicate. Through the duplicate checking operation, a repeated instance can be prevented from existing in the history-based displacement vector prediction list.

Optionally, when the duplicate checking operation is performed on the first displacement vector, a duplicate checking range includes, but not limited to, the following several optional forms: (1) duplicate checking and comparison are performed on the first displacement vector and all displacement vectors in the history-based displacement vector prediction list; (2) duplicate checking and comparison are performed on the first displacement vector and M displacement vectors in the history-based displacement vector prediction list, M being a set value, for example, M displacement vectors that rank at the top in the history-based displacement vector prediction list or M displacement vectors that rank at the bottom in the history-based displacement vector prediction list; and (3) duplicate checking and comparison are performed on the first displacement vector and a preset displacement vector, for example, the preset displacement vector may be (0, 1). Duplicate checking and comparison are performed on the first displacement vector and all the displacement vectors in the list, achieving more comprehensive duplicate checking and comparison. Duplicate checking and comparison are performed on the first displacement vector and some displacement vectors or the preset displacement vector in the list, which helps to reduce a quantity of times of duplicate checking and comparison, thereby reducing the processing complexity of a codec.

The first displacement vector is added to the history-based displacement vector prediction list in a case that a result of the duplicate checking is that there is no duplicate. In a case that the result of the duplicate checking is that there is a duplicate, the first displacement vector is not added to the history-based displacement vector prediction list, or a displacement vector that is the same as the first displacement vector is removed from the history-based displacement vector prediction list, and the first displacement vector is added to the history-based displacement vector prediction list.

Optionally, the adding a first displacement vector to the history-based displacement vector prediction list includes: inserting the first displacement vector into a tail or a head of the history-based displacement vector prediction list in a case that a length of the history-based displacement vector prediction list is less than a maximum length; and in a case that the length of the history-based displacement vector prediction list is equal to the maximum length, removing, according to a first in first out principle, a displacement vector that is first inserted into the history-based displacement vector prediction list, and inserting the first displacement vector into the tail or the head of the history-based displacement vector prediction list.

In an example, the first displacement vector is not repeated with a second displacement vector, which refers to that the first displacement vector is not the same as the second displacement vector. In another example, the first displacement vector is not repeated with the second displacement vector, which refers to that the first displacement vector is not the same as the second displacement vector and auxiliary information corresponding to the first displacement vector is similarly not the same as auxiliary information corresponding to the second displacement vector. Optionally, the auxiliary information includes, but not limited to, size information, position information, a quantity of duplicates, and a prediction mode.

Optionally, if the result of the duplicate checking is that there is a duplicate, at least one of the following operations is further performed, and information about an existing instance in the history-based displacement vector prediction list is updated: (1) storing a displacement vector corresponding to larger size information and auxiliary information thereof in the first displacement vector and a displacement vector repeated with the first displacement vector, that is, if size information corresponding to the repeated displacement vector is less than size information corresponding to the first displacement vector, the size information of the repeated displacement vector is updated as the size information corresponding to the first displacement vector; (2) storing position information of the first displacement vector; or (3) adding 1 to a quantity of duplicates of displacement vector repeated with the first displacement vector. In the foregoing manner, in a case that the result of the duplicate checking is that a duplicate exists, information (auxiliary information such as the size information, the position information, and the quantity of duplicates) about an existing instance in the list is updated, to ensure the effectiveness of the information about the existing instance in the list.

Optionally, the at least one candidate displacement vector derived from the history-based displacement vector prediction list is sorted in any one of the following manners: sorting according to an encoding sequence, sorting according to size information, sorting according to a distance from the current unit, or sorting according to a prediction mode. For example, the candidate displacement vectors are derived according to the encoding sequence from back to front, and the derived candidate displacement vectors are sorted according to the encoding sequence from back to front, that is, an instance of which an encoding sequence is closer to a current unit has a higher priority. In another example, the derived candidate displacement vectors are sorted according to a size (for example, a block size or a string length) from large to small. In still another example, the derived candidate displacement vectors are sorted according to a distance to the current unit from near to far.

In an exemplary embodiment, an instance to be added to the history-based displacement vector prediction list is determined in the following manners:

(1) in a case that each IBC block is encoded or decoded, any one of the following manners is used:

manner 1: newly creating an instance, and recording a BV of the IBC block; or manner 2: in a case that an area (for example, a width*a height) of the IBC block is greater than or equal to a preset area, newly creating an instance, and recording a BV of the IBC block.

(2) in a case that each ISC block is encoded or decoded, any one of the following manners is used:

manner 1: newly creating a plurality of instances, and recording SVs of all strings in the ISC block;

manner 2: newly creating one or more instances, and recording an SV of a string of which a length is greater than a preset length in the ISC block;

manner 3: newly creating an instance, and recording an SV of a string with a maximum length in the ISC block;

manner 4: newly creating an instance, and recording an SV of a first string or a last string in the ISC block;

manner 5: performing any operation of the manner 1 to the manner 4 in (2) in a case that an area (for example, a width*a height) of the ISC block is greater than or equal to a preset area; or manner 6: performing any operation of the manner 1 to the manner 4 in (2) in a case that a length of a maximum string in the ISC block is greater than or equal to a preset length.

(3) as an alternative implementation of (2), in a case that each string in an ISC block is encoded or decoded, any one of the following manners is used:

manner 1: newly creating an instance, and recording an SV of the string;

manner 2: in a case that a length of the string is greater than or equal to a preset length, newly creating an instance, and recording an SV of the string;

manner 3: in a case that the string is a first string or a last string in the ISC block, newly creating an instance, and recording an SV of the string; or manner 4: in a case that an area (for example, a width*a height) of the ISC block is greater than or equal to a preset area, newly creating an instance, and recording an SV of the string.

Any instance newly created in the manner (1) to the manner (3) may be used as a to-be-added first displacement vector, and subsequently, whether the first displacement vector is added to the history-based displacement vector prediction list is determined through the above duplicate checking operation.

In addition, considering that a larger block area or string length indicates a larger possibility of correlation with another encoding or decoding unit, only when the area of the IBC block is greater than or equal to a preset area or when the string length is greater than or equal to a preset length, an instance is newly created, and a BV of the IBC block is recorded or an SV of the string is recorded, which helps to improve a possibility that the displacement vector is selected as a predicted displacement vector, thereby improving the encoding performance. In addition, if the block area or the string length is not considered, the codec has lower processing complexity.

In addition, compared with the manner (3) and the manner (2), when each string is encoded or decoded, the history-based displacement vector prediction list is updated. In this way, before encoding or decoding is performed from a next string, information about a former string may be used. Moreover, more adjacent units have larger correlation. Therefore, the manner (3) helps to further improve the encoding performance.

Optionally, in the manner (1) to the manner (3), in addition to recording the displacement vector of the historical unit, auxiliary information may be further recorded, which includes, but not limited to, one or a combination of more of the following:

a. Size information of the historical unit. Optionally, in a case that a prediction mode of the historical unit is an IBC prediction mode, the size information of the historical unit includes an area (for example, a quantity of pixels included in the block) of a block corresponding to a BV. In a case that the prediction mode of the historical unit is an ISC prediction mode, the size information of the historical unit includes a length (for example, a quantity of pixels included in the string) of a string corresponding to an SV.

b. Position information of the historical unit Optionally, in a case that the prediction mode of the historical unit is the IBC prediction mode, the position information of the historical unit includes coordinates of an upper left corner of the block corresponding to the BV. In a case that the prediction mode of the historical unit is the ISC prediction mode, the position information of the historical unit includes coordinates of a representation pixel in the string corresponding to the SV or coordinates of a corner point of a bounding rectangle of the string corresponding to the SV. For example, the representation pixel is a first pixel according to a string scanning sequence or a last pixel according to a string scanning sequence. In addition, the bounding rectangle of the string is a rectangular region with a minimum area including the string. Optionally, the corner point of the bounding rectangle is a vertex at an upper left corner of the bounding rectangle.

c. A quantity of duplicates of displacement vector of the historical unit. Optionally, a quantity of duplicates of newly added instance is set to 1.

d. A prediction mode of the historical unit.

By recording the auxiliary information, the auxiliary information may be used as a reference when the operation such as duplicate checking and comparison or sorting is performed.

Based on the foregoing, in various embodiments, by constructing a history-based displacement vector prediction list, displacement vectors of a historical unit related to a plurality of prediction modes are recorded, and a predicted displacement vector of a current unit is derived from the list, to obtain the displacement vectors related to the plurality of prediction modes as candidate displacement vectors.

In an exemplary embodiment, the candidate displacement vector is obtained by using the following steps:

1. Construct a history-based displacement vector prediction list, the history-based displacement vector prediction list including a displacement vector and auxiliary information of a historical unit.
2. Classify displacement vectors in the history-based displacement vector prediction list according to the auxiliary information.
3. Generate a class-based displacement vector prediction list based on displacement vectors in classes.
4. Derive the candidate displacement vector from the class-based displacement vector prediction list.

For a description and a construction process of the history-based displacement vector prediction list, reference may be made to the foregoing embodiment. Details are not described herein again.

In an example, the displacement vectors in the history-based displacement vector prediction list are classified according to size information.

For example, one or more size thresholds are set, and a class to which a displacement vector belongs is determined according to a magnitude relationship between size information of the displacement vector in the history-based displacement vector prediction list and the size threshold. For example, a size threshold Ts is set, displacement vectors of which sizes are greater than (or greater than or equal to) Ts are classified into a class, and displacement vectors of which sizes are less than or equal to (or less than) Ts are classified into a class.

In another example, the displacement vectors in the history-based displacement vector prediction list are classified according to position information.

It is assumed that coordinates of an upper left corner of a current block are $(x_0, y_0)$, a width and a height are respectively w and h, and coordinates of an upper left corner of a to-be-classified instance are $(x_1, y_1)$, there are the following optional classification methods:

(1) classifying instances on the left $(x_i<x_0)$ into a class;

(2) classifying instances on the top $(y_i<y_0)$ into a class;

(3) classifying instances on the front-left $(x_i<x_0,\ y_i\geq y_0$, and $y_i<y_0+h)$ into a class;

(4) classifying instances on the right top $(y_i<y_0,\ x_i\geq x_0$, and $x_i\leq x_0+w)$ into a class;

(5) classifying instances on the upper left $(y_i<y_0$ and $x_i<x_0)$ into a class;

(6) classifying instances on the upper right $(y_i<y_0$ and $x_i\geq x_0+w)$ into a class; and (7) classifying instances on the lower left $(y_i\geq y_0+h$ and $x_i<x_0)$ into a class.

In another example, the displacement vectors in the history-based displacement vector prediction list are classified according to a quantity of duplicates.

For example, one or more quantity thresholds of duplicates are set. A class to which a displacement vector belongs is determined according to a magnitude relationship between a quantity of duplicates of the displacement vector in the history-based displacement vector prediction list and the quantity threshold of duplicates. For example, the quantity threshold of duplicates is set to $T_c$. Displacement vectors of which quantities of duplicates are greater than (or greater than or equal to) $T_c$ are classified into a class, and displacement vectors of which quantities of duplicates are less than or equal to (or less than) $T_c$ are classified into a class.

The classification manners described above are merely exemplary and explanatory. In a possible embodiment, the displacement vectors in the history-based displacement vector prediction list may be further classified in combination with a plurality of classification manners. For example, the displacement vectors are classified according to the size information and the position information. This is not limited in various embodiments of this application.

Optionally, the displacement vectors in the classes are sorted in any one of the following manners: sorting according to an encoding sequence, sorting according to size information, sorting according to a distance from the current unit, or sorting according to a quantity of duplicates. For example, the displacement vectors are sorted according to the encoding sequence from back to front, that is, an instance of which an encoding sequence is closer to a current unit has a higher priority. In another example, the displacement vectors are sorted according to a size (for example, a block size or a string length) from large to small. In still another example, the displacement vectors are sorted according to a distance to the current unit from near to far. In still another example, the displacement vectors are sorted in descending order according to a quantity of duplicates.

Optionally, the class-based displacement vector prediction list is generated based on a classification result. When a class is selected, a $K^{th}$ instance (that is, a displacement vector) in the class is derived according to a preset rule as the predicted displacement vector of the current unit, K being a positive integer.

Based on the foregoing, in various embodiments, by constructing a history-based displacement vector prediction list, displacement vectors of a historical unit related to a plurality of prediction modes are recorded, displacement vectors in the history-based displacement vector prediction list are classified, to generate a class-based displacement vector prediction list, and a predicted displacement vector of a current unit is derived from the class-based displacement vector prediction list, to obtain displacement vectors related to the plurality of prediction modes as candidate displacement vectors.

In an exemplary embodiment, the candidate displacement vector is obtained by using the following steps: obtaining a displacement vector of an adjacent unit of the current unit as the candidate displacement vector.

The adjacent unit of the current unit is an image unit of which a distance from the current unit is less than a specific value. In the IBC prediction mode, the current unit is the current block, and the adjacent unit of the current unit is an adjacent block of the current block. In the ISC prediction mode, the current unit is the current string, and the adjacent unit of the current unit is an adjacent string of the current string. The adjacent string of the current string may be a string in the adjacent block of the current block, and the current block is an encoding/decoding block to which the current string belongs. In addition, it is assumed that coordinates of an upper left corner of the current block are (x, y), a width is w, and a height is h, the adjacent blocks of the current block may be, but not limited to, blocks at positions A0, A1, B0, B1, and B2 shown in a part (a) in FIG. 2.

Optionally, a block vector of the adjacent unit is derived as the candidate displacement vector in a case that a prediction mode of the adjacent unit is an IBC prediction mode.

Optionally, the candidate displacement vector is derived in any one of the following manners in a case that the prediction mode of the adjacent unit is an ISC prediction mode:

(1) deriving a string vector of a string including position information of the current unit in the adjacent unit;

(2) deriving a string vector of a string of which a length is greater than a preset threshold in the adjacent unit;

(3) deriving a string vector of a string with a maximum length in the adjacent unit;

(4) deriving a string vector of a first string or a last string in the adjacent unit; or (5) deriving string vectors of all strings in the adjacent unit.

Based on the foregoing, in various embodiments, a displacement vector of an adjacent unit of a current unit is obtained as a candidate displacement vector, and the adjacent unit may include displacement vectors related to a plurality of prediction modes. Therefore, the displacement vectors related to the plurality of prediction modes are obtained as the candidate displacement vectors.

In an exemplary embodiment, the candidate displacement vector is obtained by using the following steps: obtaining a preset displacement vector as the at least one candidate displacement vector.

Optionally, the preset displacement vector related to a prediction mode of the current unit is obtained as the candidate displacement vector. For example, corresponding preset displacement vectors are set for different prediction modes. After a prediction mode of the current unit is determined, a preset displacement vector corresponding to the prediction mode of the current unit is obtained based on the correspondence as the candidate displacement vector.

Optionally, in a case that the prediction mode of the current unit is an IBC prediction mode or an ISC prediction mode and a width of the current unit is w and a height of the current unit is h, the candidate displacement vector includes at least one of the following: (−w, −h), (−w, 0), (0, −h, (−2*w, 0), or (0, −2*h); and in a case that the prediction mode of the current unit is the ISC prediction mode and a width of a bounding rectangle of the current unit is ws and a height of the bounding rectangle is hs, the candidate displacement vector includes at least one of the following: (−ws, −hs), (−ws, 0), (0, −hs), (−2*ws, 0), or (0, −2*hs). The bounding rectangle of the current unit is a minimum bounding rectangle including the current unit. For example, when the current unit is a string, the bounding rectangle thereof is a rectangular region with a minimum area including the string.

Based on the foregoing, in various embodiments, corresponding preset displacement vectors are set for different prediction modes, and the preset displacement vectors are obtained as candidate displacement vectors, to obtain displacement vectors related to the plurality of prediction modes as the candidate displacement vectors.

Figure 8:
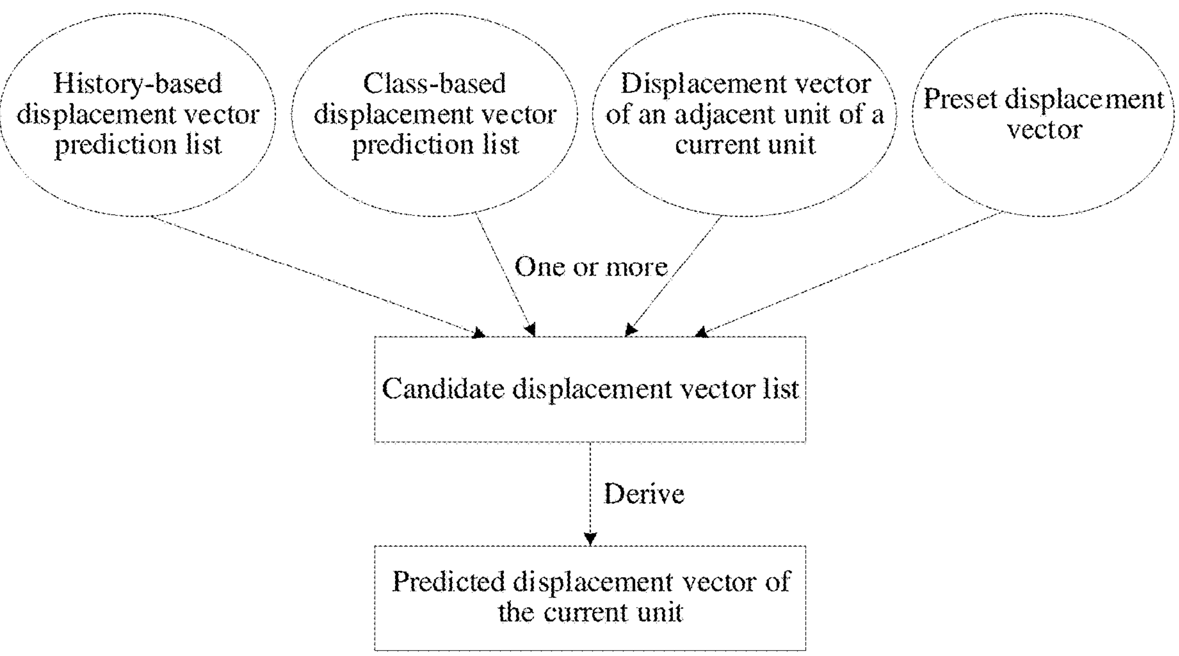
FIG. 8 is a schematic diagram of generating a candidate displacement vector list according to an embodiment of this application.

As shown in FIG. 8, a plurality of manners of obtaining a candidate displacement vector are described in the foregoing embodiments, which include: obtaining the candidate displacement vector from the history-based displacement vector prediction list, obtaining the candidate displacement vector from the class-based displacement vector prediction list, obtaining the candidate displacement vector from the displacement vector of the adjacent unit of the current unit, obtaining the candidate displacement vector from the preset displacement vector, and the like. The plurality of manners may be used alone or may be used in combination of two or more manners. This is not limited in various embodiments of this application.

Optionally, a length of the history-based displacement vector prediction list described above may adopt a preset value or may be set according to a prediction mode existing in a bit stream. It is assumed that the length of the history-based displacement vector prediction list is N, and in a case that there is only an IBC block in the bit stream, N=N1; in a case that there is only an ISC block in the bit stream, N=N2; and in a case that there are the IBC block and the ISC block in the bit stream, N=N1+N2, where N1 is a list length in a case that the IBC block is allowed to exist in the bit stream, and N2 is a list length in a case that the ISC block is allowed to exist in the bit stream. Optionally, whether there is an IBC prediction mode or an ISC prediction mode in the bit stream is determined by a flag bit in a sequence header information (for example, a sequence parameter set (SPS)) corresponding to the mode thereof.

Figure 9:
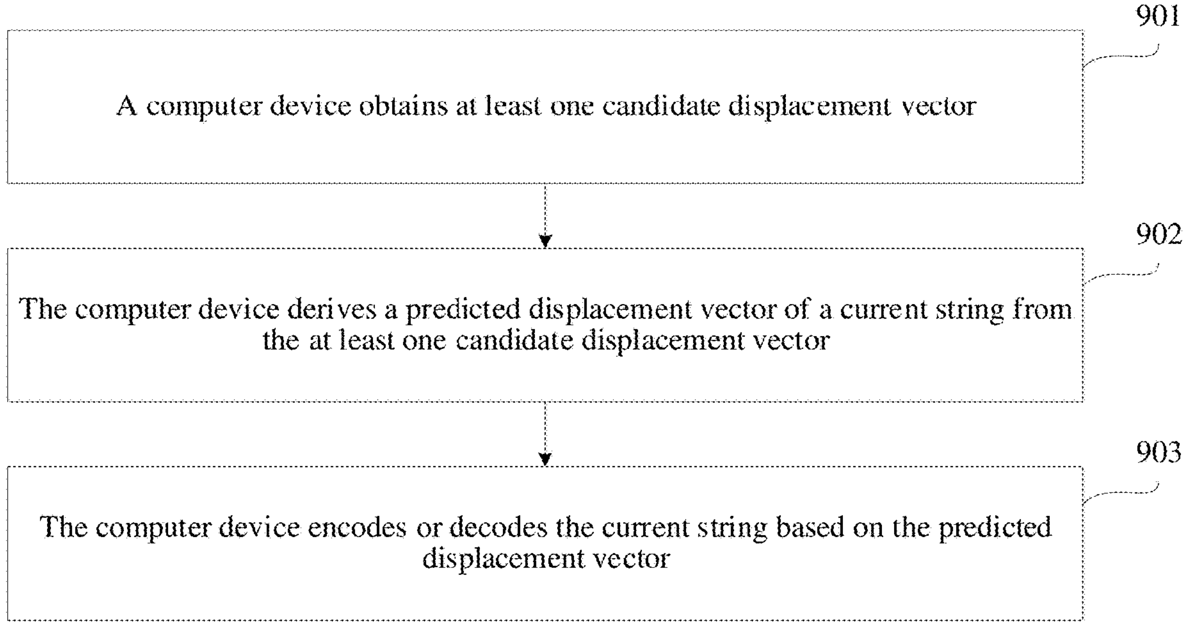
FIG. 9 is a flowchart of a string vector prediction method in video encoding and decoding according to an embodiment of this application.

FIG. 9 is a flowchart of a string vector prediction method in video encoding and decoding according to an embodiment of this application. For ease of description, the description is provided by merely using a computer device as an execution body of steps. The method may include the following steps (901 to 903):

Step 901. A computer device obtains at least one candidate displacement vector.

In various embodiments, the candidate displacement vector is used for providing a candidate for deriving a predicted displacement vector of a current string. There may be one or more candidate displacement vectors. For example, there may be one same displacement vector determined based on an IBC prediction mode and an ISC prediction mode. In this case, there is one obtained candidate displacement vector. For an encoding process, the candidate displacement vectors may be displacement vectors of some encoded units. For a decoding process, the candidate displacement vectors may be displacement vectors of some decoded units.

Step 902. The computer device derives a predicted displacement vector of a current string from the at least one candidate displacement vector.

In various embodiments, the predicted displacement vector refers to a predicted value of a displacement vector of the current string obtained by predicting the displacement vector of the current string based on a displacement vector prediction technology. The predicted displacement vector may be a string vector predictor (SVP).

In an example, for a string vector prediction scenario, the candidate displacement vector includes only a string vector generated by using an ISC prediction mode.

In another example, for the string vector prediction scenario, the candidate displacement vector includes displacement vectors related to at least two prediction modes. For example, the at least two prediction modes may include an IBC prediction mode and an ISC prediction mode. In this case, for an obtaining manner of the candidate displacement vector, reference may be made to the descriptions in the foregoing embodiments. Details are not described in various embodiments.

Step 903. The computer device encodes or decodes the current string based on the predicted displacement vector.

After the predicted displacement vector of the current string is derived, for an encoding process, the current string may be encoded based on the predicted displacement vector. For a decoding process, the current string may be decoded based on the predicted displacement vector.

Based on the foregoing, according to the technical solution provided in various embodiments of this application, candidate displacement vectors are obtained, and a predicted displacement vector of a current string is derived from the candidate displacement vectors. A string vector prediction method is provided for an intra string copy technology, and in the intra string copy, the encoding performance of a string vector may also be improved by using the string vector prediction technology.

In addition, when the candidate displacement vector includes displacement vectors related to at least two prediction modes, the candidate displacement vectors are constructed by combining displacement vectors related to a plurality of prediction modes, and then the predicted displacement vector of the current string is derived from the candidate displacement vectors. This solution can not only use information about an encoded/decoded unit having a same prediction mode as the current string but also allows to be combined with information about an encoded/decoded unit having different prediction modes from the current string to derive the predicted displacement vector of the current string, so that the candidate displacement vector has a higher possibility to be selected as the predicted displacement vector, thereby improving the encoding performance of the displacement vector.

The following describes apparatus embodiments of this application, which can be used to execute the method embodiments of this application. For details not disclosed in the apparatus embodiments of this application, refer to the method embodiments of this application.

Figure 10:
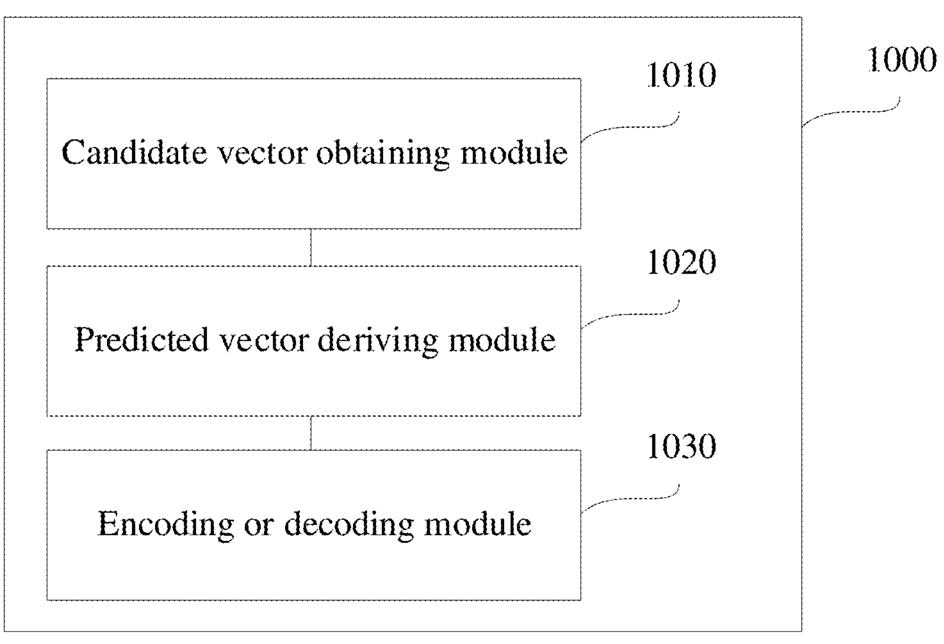
FIG. 10 is block diagram of a displacement vector prediction apparatus in video encoding and decoding according to an embodiment of this application.

FIG. 10 is block diagram of a displacement vector prediction apparatus in video encoding and decoding according to an embodiment of this application. The apparatus has functions of implementing the foregoing displacement vector prediction method in video encoding and decoding. The functions may be implemented by hardware, or may be implemented by hardware executing corresponding software. The apparatus may be the computer device described above, or may be disposed in the computer device. The apparatus 1000 may include: a candidate vector obtaining module 1010, a predicted vector deriving module 1020, and an encoding or decoding module 1030.

The candidate vector obtaining module 1010 is configured to obtain a candidate displacement vector, the candidate displacement vector including displacement vectors related to at least two prediction modes.

The predicted vector deriving module 1020 is configured to derive a predicted displacement vector of a current unit from the at least one candidate displacement vector.

The encoding or decoding module 1030 is configured to encode or decode the current unit based on the predicted displacement vector.

In an exemplary embodiment, the at least two prediction modes include an IBC prediction mode and an ISC prediction mode.

In an exemplary embodiment, the candidate vector obtaining module 1010 is configured to:

construct a history-based displacement vector prediction list, the history-based displacement vector prediction list including a displacement vector of a historical unit; and derive the candidate displacement vector from the history-based displacement vector prediction list.

In an exemplary embodiment, the apparatus 1000 further includes a list updating module, configured to:

before adding a first displacement vector to the history-based displacement vector prediction list, perform a duplicate checking operation on the first displacement vector;

add the first displacement vector to the history-based displacement vector prediction list in a case that a result of the duplicate checking is that there is no duplicate; and in a case that the result of the duplicate checking is that there is a duplicate, skip adding the first displacement vector to the history-based displacement vector prediction list, or remove a displacement vector that is the same as the first displacement vector in the history-based displacement vector prediction list, and add the first displacement vector to the history-based displacement vector prediction list.

In an exemplary embodiment, the at least one candidate displacement vector is sorted in any one of the following manners: sorting according to an encoding sequence, sorting according to size information, sorting according to a distance from the current unit, or sorting according to a prediction mode.

In an exemplary embodiment, the candidate vector obtaining module 1010 is configured to:

construct a history-based displacement vector prediction list, the history-based displacement vector prediction list including a displacement vector and auxiliary information of a historical unit;

classify displacement vectors in the history-based displacement vector prediction list according to the auxiliary information;

generate a class-based displacement vector prediction list based on displacement vectors in classes; and derive the at least one candidate displacement vector from the class-based displacement vector prediction list.

In an exemplary embodiment, the candidate vector obtaining module 1010 is configured to:

classify the displacement vectors in the history-based displacement vector prediction list according to size information; and/or classify the displacement vectors in the history-based displacement vector prediction list according to position information; and/or classify the displacement vectors in the history-based displacement vector prediction list according to a quantity of duplicates.

In an exemplary embodiment, the displacement vectors in the classes are sorted in any one of the following manners: sorting according to an encoding sequence, sorting according to size information, sorting according to a distance from the current unit, or sorting according to a quantity of duplicates.

In an exemplary embodiment, the candidate vector obtaining module 1010 is configured to: obtain a displacement vector of an adjacent unit of the current unit as the candidate displacement vector.

In an exemplary embodiment, the candidate vector obtaining module 1010 is configured to:

derive a block vector of the adjacent unit as the candidate displacement vector in a case that a prediction mode of the adjacent unit is an IBC prediction mode; and derive the candidate displacement vector in any one of the following manners in a case that the prediction mode of the adjacent unit is an ISC prediction mode:

derive a string vector of a string including position information of the current unit in the adjacent unit;

derive a string vector of a string of which a length is greater than a preset threshold in the adjacent unit;

derive a string vector of a string with a maximum length in the adjacent unit;

derive a string vector of a first string or a last string in the adjacent unit; or derive string vectors of all strings in the adjacent unit.

In an exemplary embodiment, the candidate vector obtaining module 1010 is configured to obtain a preset displacement vector as the candidate displacement vector.

In an exemplary embodiment, the candidate vector obtaining module 1010 is configured to obtain the preset displacement vector related to a prediction mode of the current unit as the candidate displacement vector.

In an exemplary embodiment, in a case that the prediction mode of the current unit is an IBC prediction mode or an ISC prediction mode and a width of the current unit is w and a height of the current unit is h, the candidate displacement vector includes at least one of the following: (−w, −h), (−w, 0), (0, −h, (−2*w, 0), or (0, −2*h); and in a case that the prediction mode of the current unit is the ISC prediction mode and a width of a bounding rectangle of the current unit is ws and a height of the bounding rectangle is hs, the candidate displacement vector includes at least one of the following: (−ws, −hs), (−ws, 0), (0, −hs), (−2*ws, 0), or (0, −2*hs).

In an exemplary embodiment, in a case that the prediction mode of the current unit is only the IBC prediction mode, the predicted displacement vector of the current unit is derived by using a hybrid vector prediction technology;

in a case that the prediction mode of the current unit is only the ISC prediction mode, the predicted displacement vector of the current unit is derived by using a hybrid vector prediction technology; or in a case that the prediction mode of the current unit is the IBC prediction mode or the ISC prediction mode, the predicted displacement vector of the current unit is derived by using a hybrid vector prediction technology.

In an exemplary embodiment, an instance to be added to the history-based displacement vector prediction list is determined in the following manners:

in a case that each IBC block is encoded or decoded, any one of the following manners is used:

manner 1: newly creating an instance, and recording a BV of the IBC block; or manner 2: in a case that an area of the IBC block is greater than or equal to a preset area, newly creating an instance, and recording a BV of the IBC block.

In a case that each ISC block is encoded or decoded, any one of the following manners is used:

manner 1: newly creating a plurality of instances, and recording SVs of all strings in the ISC block;

manner 2: newly creating one or more instances, and recording an SV of a string of which a length is greater than a preset length in the ISC block;

manner 3: newly creating an instance, and recording an SV of a string with a maximum length in the ISC block;

manner 4: newly creating an instance, and recording an SV of a first string or a last string in the ISC block;

manner 5: performing any operation of the manner 1 to the manner 4 in a case that an area of the ISC block is greater than or equal to a preset area; or manner 6: performing any operation of the manner 1 to the manner 4 in a case that a length of a maximum string in the ISC block is greater than or equal to a preset length.

In a case that each string in an ISC block is encoded or decoded, any one of the following manners is used:

manner 1: newly creating an instance, and recording an SV of the string;

manner 2: in a case that a length of the string is greater than or equal to a preset length, newly creating an instance, and recording an SV of the string;

manner 3: in a case that the string is a first string or a last string in the ISC block, newly creating an instance, and recording an SV of the string; or manner 4: in a case that an area of the ISC block is greater than or equal to a preset area, newly creating an instance, and recording an SV of the string.

In an exemplary embodiment, the auxiliary information of the historical unit includes at least one of the following: size information, position information, a quantity of duplicates of displacement vector, or a prediction mode, where in a case that a prediction mode of the historical unit is an IBC prediction mode, the size information of the historical unit includes an area of a block corresponding to a BV; in a case that the prediction mode of the historical unit is an ISC prediction mode, the size information of the historical unit includes a length of a string corresponding to an SV;

in a case that the prediction mode of the historical unit is the IBC prediction mode, the position information of the historical unit includes coordinates of an upper left corner of the block corresponding to the BV; and in a case that the prediction mode of the historical unit is the ISC prediction mode, the position information of the historical unit includes coordinates of a representation pixel in the string corresponding to the SV or coordinates of a corner point of a bounding rectangle of the string corresponding to the SV.

In an exemplary embodiment, a length of the history-based displacement vector prediction list is N, where in a case that there is only an IBC block in the bit stream, N=N1;

in a case that there is only an ISC block in the bit stream, N=N2; and in a case that there are the IBC block and the ISC block in the bit stream, N=N1+N2, where N1 is a list length in a case that the IBC block is allowed to exist in the bit stream, and N2 is a list length when the ISC block is allowed to exist in the bit stream.

Based on the foregoing, according to the technical solution provided in various embodiments of this application, candidate displacement vectors are constructed by combining displacement vectors related to a plurality of prediction modes, and then a predicted displacement vector of a current unit is derived from the candidate displacement vectors. This solution can not only use information about an encoded/decoded unit having a same prediction mode as the current unit but also allows to be combined with information about an encoded/decoded unit having different prediction modes from the current unit to derive the predicted displacement vector of the current unit, so that the candidate displacement vector has a higher possibility to be selected as the predicted displacement vector, thereby improving the encoding performance of the displacement vector.

Figure 11:
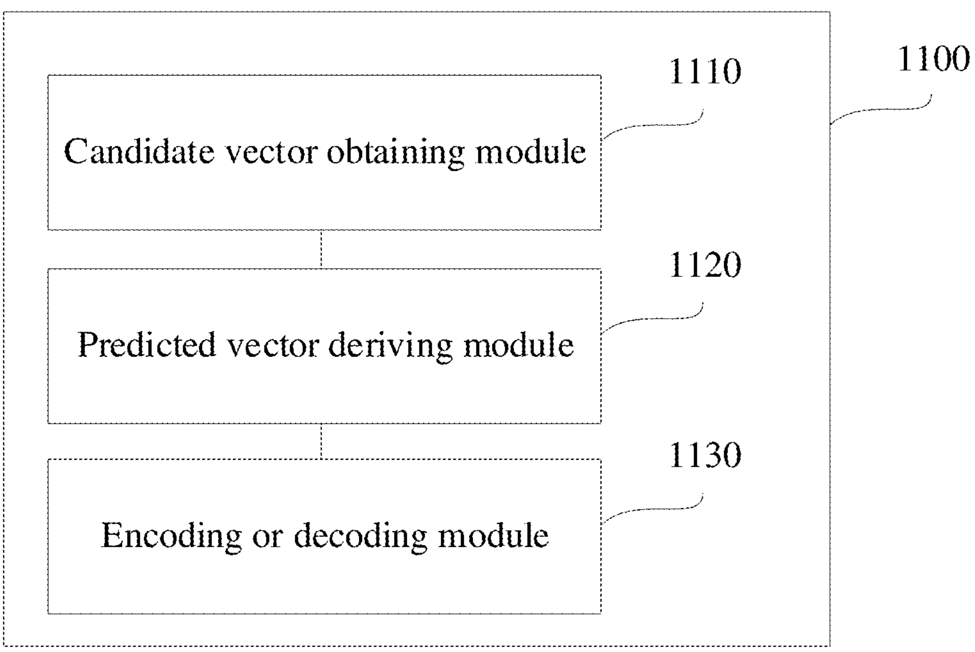
FIG. 11 is a block diagram of a string vector prediction apparatus in video encoding and decoding according to an embodiment of this application.

FIG. 11 is a block diagram of a string vector prediction apparatus in video encoding and decoding according to an embodiment of this application. The apparatus has functions of implementing the examples of the string vector prediction method in video encoding and decoding. The functions may be implemented by hardware, or may be implemented by hardware executing corresponding software. The apparatus may be the computer device described above, or may be disposed in the computer device. The apparatus 1100 may include: a candidate vector obtaining module 1110, a predicted vector deriving module 1120, and an encoding or decoding module 1130.

The candidate vector obtaining module 1110 is configured to obtain at least one candidate displacement vector.

The predicted vector deriving module 1120 is configured to derive a predicted displacement vector of a current string from the at least one candidate displacement vector.

The encoding or decoding module 1130 is configured to encode or decode the current string based on the predicted displacement vector.

In an exemplary embodiment, the candidate displacement vector includes only a string vector generated by using an ISC prediction mode.

In an exemplary embodiment, the candidate displacement vector includes displacement vectors related to at least two prediction modes.

Based on the foregoing, according to the technical solution provided in various embodiments of this application, candidate displacement vectors are obtained, and a predicted displacement vector of a current string is derived from the candidate displacement vectors. A string vector prediction method is provided for an intra string copy technology, and in the intra string copy, the encoding performance of a string vector may also be improved by using the string vector prediction technology.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 12:
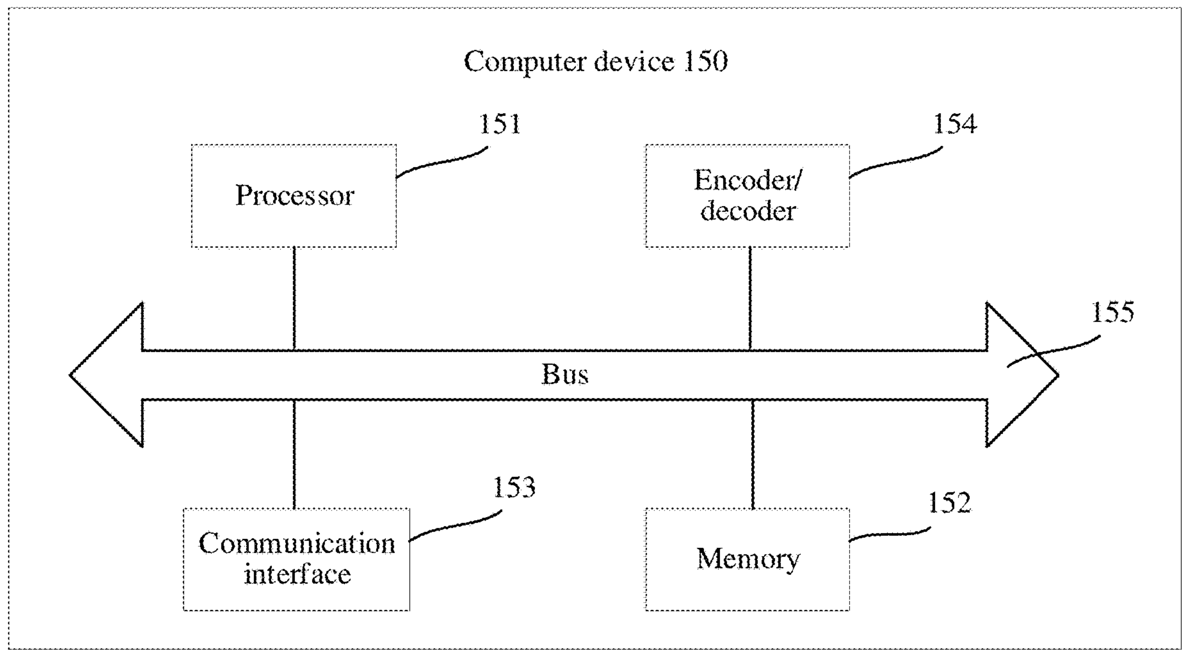
FIG. 12 is a structural block diagram of a computer device according to an embodiment of this application.

FIG. 12 is a schematic block diagram of a computer device according to an embodiment of this application. The computer device may be the encoder side device described above or may be the decoder side device described above. The computer device 150 may include: a processor 151, a memory 152, a communication interface 153, an encoder/decoder 154, and a bus 155.

The processor 151 includes one or more processing cores, and the processor 151 performs various functional applications and information processing by running a software program and module.

The memory 152 may be configured to store a computer program. The processor 151 is configured to execute the computer program to implement the displacement vector prediction method in video encoding and decoding or implement the string vector prediction method in video encoding and decoding.

The communication interface 153 may be configured to communicate with another device, for example, receiving and transmitting audio and video data.

The encoder/decoder 154 may be configured to implement an encoding and decoding function, for example, encoding and decoding the audio and video data.

The memory 152 is connected to the processor 151 by using the bus 155.

In addition, the memory 152 may be implemented by any type of a volatile or nonvolatile storage device or a combination thereof. The volatile or nonvolatile storage device includes, but not limited to, a disk or an optical disc, an electrically-erasable programmable read-only memory (EEPROM), an erasable programmable read-only memory (EPROM), a static random access memory (SRAM), a read-only memory (ROM), a magnetic memory, a flash memory, and a programmable read-only memory (PROM).

A person skilled in the art may understand that the structure shown in FIG. 12 does not constitute any limitation on the computer device 120, and the computer device may include more components or fewer components than those shown in the figure, or some components may be combined, or a different component deployment may be used.

An exemplary embodiment further provides a computer-readable storage medium, storing at least one instruction, the at least one instruction being loaded and executed by a processor to implement the displacement vector prediction method in video encoding and decoding or implement the string vector prediction method in video encoding and decoding.

An exemplary embodiment further provides a computer program product, the computer program product, when executed by a processor, being used for implementing the displacement vector prediction method in video encoding and decoding or implementing the string vector prediction method in video encoding and decoding.

It is to be understood that "plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The present disclosure describes various embodiments for a displacement vector prediction method in video encoding and/or decoding. The method includes obtaining at least one candidate displacement vector, the at least one candidate displacement vector comprising displacement vectors related to at least two prediction modes; deriving a predicted displacement vector of a current unit from the at least one candidate displacement vector; and/or encoding or decoding the current unit based on the predicted displacement vector.

In some implementations, the at least two prediction modes comprise: an intra block copy (IBC) prediction mode and an intra string copy (ISC) prediction mode.

In some implementations, the obtaining at least one candidate displacement vector comprises: constructing a history-based displacement vector prediction list, the history-based displacement vector prediction list comprising a displacement vector of a historical unit; and/or deriving the at least one candidate displacement vector from the history-based displacement vector prediction list.

In some implementations, the displacement vector prediction method may further include: before adding a first displacement vector to the history-based displacement vector prediction list, performing a duplicate checking operation on the first displacement vector; adding the first displacement vector to the history-based displacement vector prediction list in a case that a result of the duplicate checking is that there is no duplicate; and/or in a case that the result of the duplicate checking is that there is a duplicate, skipping adding the first displacement vector to the history-based displacement vector prediction list, or removing a displacement vector that is the same as the first displacement vector in the history-based displacement vector prediction list, and adding the first displacement vector to the history-based displacement vector prediction list.

In some implementations, the at least one candidate displacement vector is sorted in any one of the following manners: sorting according to an encoding sequence, sorting according to size information, sorting according to a distance between the current unit and the candidate displacement vector, or sorting according to a prediction mode.

In some implementations, the obtaining at least one candidate displacement vector comprises: constructing a history-based displacement vector prediction list, the history-based displacement vector prediction list comprising a displacement vector and auxiliary information of a historical unit; classifying displacement vectors in the history-based displacement vector prediction list according to the auxiliary information; generating a class-based displacement vector prediction list based on displacement vectors in classes; and/or deriving the at least one candidate displacement vector from the class-based displacement vector prediction list.

In some implementations, the classifying displacement vectors in the history-based displacement vector prediction list according to the auxiliary information comprises at least one of the following: classifying the displacement vectors in the history-based displacement vector prediction list according to size information; classifying the displacement vectors in the history-based displacement vector prediction list according to position information; or classifying the displacement vectors in the history-based displacement vector prediction list according to a quantity of duplicates;

In some implementations, the displacement vectors in the classes are sorted in any one of the following manners: sorting according to an encoding sequence, sorting according to size information, sorting according to a distance between the displacement vector and the current unit, or sorting according to a quantity of duplicates.

In some implementations, the obtaining at least one candidate displacement vector comprises: obtaining a displacement vector of an adjacent unit of the current unit as the candidate displacement vector.

In some implementations, the obtaining a displacement vector of an adjacent unit of the current unit as the candidate displacement vector comprises: deriving a block vector of the adjacent unit as the candidate displacement vector in a case that a prediction mode of the adjacent unit is an IBC prediction mode; and/or deriving the candidate displacement vector in any one of the following manners in a case that the prediction mode of the adjacent unit is an ISC prediction mode: deriving a string vector of a string comprising position information of the current unit in the adjacent unit; deriving a string vector of a string of which a length is greater than a preset threshold in the adjacent unit; deriving a string vector of a string with a maximum length in the adjacent unit; deriving a string vector of a first string or a last string in the adjacent unit; and/or deriving string vectors of all strings in the adjacent unit.

In some implementations, the obtaining at least one candidate displacement vector comprises: obtaining a preset displacement vector as the candidate displacement vector.

In some implementations, the obtaining a preset displacement vector as the candidate displacement vector comprises: obtaining the preset displacement vector related to a prediction mode of the current unit as the candidate displacement vector.

In some implementations, in a case that the prediction mode of the current unit is an IBC prediction mode or an ISC prediction mode and a width of the current unit is w and a height of the current unit is h, the candidate displacement vector comprises at least one of the following: (−w, −h), (−w, 0), (0, −h, (−2*w, 0), or (0, −2*h); and/or in a case that the prediction mode of the current unit is the ISC prediction mode and a width of a bounding rectangle of the current unit is ws and a height of the bounding rectangle is hs, the candidate displacement vector comprises at least one of the following: (−ws, −hs), (−ws, 0), (0, −hs), (−2*ws, 0), or (0, −2*hs).

In some implementations, in a case that the prediction mode of the current unit is the IBC prediction mode, the predicted displacement vector of the current unit is derived by using a hybrid vector prediction technology; or in a case that the prediction mode of the current unit is the ISC prediction mode, the predicted displacement vector of the current unit is derived by using a hybrid vector prediction technology; or in a case that the prediction mode of the current unit is the IBC prediction mode or the ISC prediction mode, the predicted displacement vector of the current unit is derived by using a hybrid vector prediction technology.

In some implementations, an instance to be added to the history-based displacement vector prediction list is determined in the following manners: in a case that each IBC block is encoded or decoded, any one of the following manners is used: manner 1: newly creating an instance, and recording a block vector (BV) of the IBC block; or manner 2: in a case that an area of the IBC block is greater than or equal to a preset area, newly creating an instance, and recording a BV of the IBC block.

In some implementations, an instance to be added to the history-based displacement vector prediction list is determined in the following manners: in a case that each ISC block is encoded or decoded, any one of the following manners is used: manner 1: newly creating a plurality of instances, and recording string vectors (SVs) of all strings in the ISC block; manner 2: newly creating one or more instances, and recording an SV of a string of which a length is greater than a preset length in the ISC block; manner 3: newly creating an instance, and recording an SV of a string with a maximum length in the ISC block; manner 4: newly creating an instance, and recording an SV of a first string or a last string in the ISC block; manner 5: performing any operation of the manner 1 to the manner 4 in a case that an area of the ISC block is greater than or equal to a preset area; or manner 6: performing any operation of the manner 1 to the manner 4 in a case that a length of a maximum string in the ISC block is greater than or equal to a preset length.

In some implementations, an instance to be added to the history-based displacement vector prediction list is determined in the following manners: in a case that each string in an ISC block is encoded or decoded, any one of the following manners is used: manner 1: newly creating an instance, and recording an SV of the string; manner 2: in a case that a length of the string is greater than or equal to a preset length, newly creating an instance, and recording an SV of the string; manner 3: in a case that the string is a first string or a last string in the ISC block, newly creating an instance, and recording an SV of the string; or manner 4: in a case that an area of the ISC block is greater than or equal to a preset area, newly creating an instance, and recording an SV of the string.

In some implementations, the auxiliary information of the historical unit comprises at least one of the following: size information, position information, a quantity of duplicates of displacement vector, or a prediction mode, wherein in a case that the prediction mode of the historical unit is an IBC prediction mode, the size information of the historical unit comprises an area of a block corresponding to a BV; in a case that the prediction mode of the historical unit is an ISC prediction mode, the size information of the historical unit comprises a length of a string corresponding to an SV; in a case that the prediction mode of the historical unit is the IBC prediction mode, the position information of the historical unit comprises coordinates of an upper left corner of the block corresponding to the BV; and in a case that the prediction mode of the historical unit is the ISC prediction mode, the position information of the historical unit comprises coordinates of a representation pixel in the string corresponding to the SV or coordinates of a corner point of a bounding rectangle of the string corresponding to the SV.

In some implementations, a length of the history-based displacement vector prediction list is N, wherein: in a case that there is only an IBC block in a bit stream, N=N1; in a case that there is only an ISC block in the bit stream, N=N2; and/or in a case that there are the IBC block and the ISC block in the bit stream, N=N1+N2, wherein N1 is a list length in a case that the IBC block is allowed to exist in the bit stream, and N2 is a list length in a case that the ISC block is allowed to exist in the bit stream.

The present disclosure describes various embodiments for a string vector prediction method in video encoding and/or decoding. The method includes obtaining a candidate displacement vector; deriving a predicted displacement vector of a current string from the candidate displacement vector; and/or encoding or decoding the current string based on the predicted displacement vector.

In some implementations, the candidate displacement vector comprises displacement vectors related to at least two prediction modes; or the candidate displacement vector comprises only a string vector generated by using an intra string copy (ISC) prediction mode.

The present disclosure describes various embodiments for a displacement vector prediction apparatus in video encoding and decoding. The apparatus includes a candidate vector obtaining module, configured to obtain a candidate displacement vector, the candidate displacement vector comprising displacement vectors related to at least two prediction modes; a predicted vector deriving module, configured to derive a predicted displacement vector of a current unit from the candidate displacement vector; and/or an encoding or decoding module, configured to encode or decode the current unit based on the predicted displacement vector. In some implementations, the apparatus may be configured to perform any portion, any combination, or all of the above methods.

The present disclosure describes various embodiments for a string vector prediction apparatus in a video encoding and decoding. The apparatus includes a candidate vector obtaining module, configured to obtain a candidate displacement vector; a predicted vector deriving module, configured to derive a predicted displacement vector of a current string from the candidate displacement vector; and/or an encoding or decoding module, configured to encode or decode the current string based on the predicted displacement vector. In some implementations, the apparatus may be configured to perform any portion, any combination, or all of the above methods.

The present disclosure describes various embodiments for a computer device, comprising a processor and a memory, the memory storing at least one instruction, the at least one instruction being loaded and executed by the processor to implement any one or any combination of the displacement vector prediction method in video encoding and/or decoding as described above, and/or to implement any one or any combination of the string vector prediction method in video encoding and/or decoding as described above.

The present disclosure describes various embodiments for a computer-readable storage medium, storing at least one instruction, the at least one instruction being loaded and executed by a processor to implement any one or any combination of the displacement vector prediction method in video encoding and/or decoding as described above, and/or to implement any one or any combination of the string vector prediction method in video encoding and/or decoding as described above.

In various embodiments in the present disclosure, a unit may refer to a software unit, a hardware unit, or a combination thereof. A software unit may include a computer program or part of the computer program that has a predefined function and works together with other related parts to achieve a predefined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

In various embodiments in the present disclosure, a module may refer to a software module, a hardware module, or a combination thereof. A software module may include a computer program or part of the computer program that has a predefined function and works together with other related parts to achieve a predefined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

The foregoing descriptions are merely examples of the embodiments of this application, but are not intended to limit this application. Any modification, equivalent replacement, or improvement made without departing from the spirit and principle of this application shall fall within the protection scope of this application.

What is claimed is:

1. A method for displacement vector prediction in video decoding, the method comprising:

determining a prediction mode of a current unit, the prediction mode indicating an intra block copy (IBC) prediction mode;

obtaining at least one candidate displacement vector based on at least one of: a history-based displacement vector prediction list, a class-based displacement vector prediction list, a displacement vector of an adjacent unit of the current unit, or a preset displacement vector, the at least one candidate displacement vector related to an intra string copy (ISC) prediction mode;

deriving a predicted displacement vector of the current unit from the at least one candidate displacement vector; and decoding the current unit based on the predicted displacement vector.

2. The method according to claim 1, wherein the obtaining the at least one candidate displacement vector comprises:

constructing a history-based displacement vector prediction list, the history-based displacement vector prediction list comprising a displacement vector of a historical unit in the ISC prediction mode; and deriving the at least one candidate displacement vector from the history-based displacement vector prediction list.

3. The method according to claim 2, further comprising:

performing a duplicate checking operation on a first displacement vector;

in response to a result of the duplicate checking indicating no duplicate, adding the first displacement vector to the history-based displacement vector prediction list; and in response to the result of the duplicate checking indicating a duplicate:

skipping adding the first displacement vector to the history-based displacement vector prediction list, or removing a displacement vector that is the same as the first displacement vector in the history-based displacement vector prediction list, and adding the first displacement vector to the history-based displacement vector prediction list.

4. The method according to claim 1, wherein the obtaining the at least one candidate displacement vector comprises:

constructing a history-based displacement vector prediction list, the history-based displacement vector prediction list comprising a displacement vector and auxiliary information of a historical unit in the ISC prediction mode;

classifying displacement vectors in the history-based displacement vector prediction list according to the auxiliary information;

generating a class-based displacement vector prediction list based on displacement vectors in classes; and deriving the at least one candidate displacement vector from the class-based displacement vector prediction list.

5. The method according to claim 4, wherein the classifying the displacement vectors in the history-based displacement vector prediction list according to the auxiliary information comprises at least one of the following:

classifying the displacement vectors in the history-based displacement vector prediction list according to size information;

classifying the displacement vectors in the history-based displacement vector prediction list according to position information; or classifying the displacement vectors in the history-based displacement vector prediction list according to a quantity of duplicates.

6. The method according to claim 1, wherein the obtaining the at least one candidate displacement vector comprises:

obtaining a displacement vector of an adjacent unit of the current unit in the ISC prediction mode as the at least one candidate displacement vector.

7. The method according to claim 6, wherein the obtaining the displacement vector of the adjacent unit of the current unit in the ISC prediction mode as the at least one candidate displacement vector comprises any one of the following manners:

deriving a string vector of a string comprising position information of the current unit in the adjacent unit;

deriving a string vector of a string of which a length is greater than a preset threshold in the adjacent unit;

deriving a string vector of a string with a maximum length in the adjacent unit;

deriving a string vector of a first string or a last string in the adjacent unit; or deriving string vectors of all strings in the adjacent unit.

8. The method according to claim 1, wherein the obtaining the at least one candidate displacement vector comprises:

obtaining a preset displacement vector related to the ISC prediction mode as the at least one candidate displacement vector.

9. The method according to claim 8, wherein:

in response to the prediction mode of the current unit being the IBC prediction mode, the candidate displacement vector comprises at least one of the following preset displacement vectors: $(-w, -h)$, $(-w, 0)$, $(0, -h)$, $(-2*w, 0)$, or $(0, -2*h)$, wherein w is a width of the current unit and h is a height of the current unit.

10. An apparatus for displacement vector prediction in video decoding, the apparatus comprising:

a memory storing instructions; and a processor in communication with the memory, wherein, when the processor executes the instructions, the processor is configured to cause the apparatus to perform:

determining a prediction mode of a current unit, the prediction mode indicating an intra block copy (IBC) prediction mode;

obtaining at least one candidate displacement vector based on at least one of: a history-based displacement vector prediction list, a class-based displacement vector prediction list, a displacement vector of an adjacent unit of the current unit, or a preset displacement vector, the at least one candidate displacement vector related to an intra string copy (ISC) prediction mode;

deriving a predicted displacement vector of the current unit from the at least one candidate displacement vector; and decoding the current unit based on the predicted displacement vector.

11. The apparatus according to claim 10, wherein, when the processor is configured to cause the apparatus to perform obtaining the at least one candidate displacement vector, the processor is configured to cause the apparatus to perform:

constructing a history-based displacement vector prediction list, the history-based displacement vector prediction list comprising a displacement vector of a historical unit in the ISC prediction mode; and deriving the at least one candidate displacement vector from the history-based displacement vector prediction list.

12. The apparatus according to claim 11, wherein, when the processor executes the instructions, the processor is configured to further cause the apparatus to perform:

performing a duplicate checking operation on a first displacement vector;

in response to a result of the duplicate checking indicating no duplicate, adding the first displacement vector to the history-based displacement vector prediction list; and in response to the result of the duplicate checking indicating a duplicate:

skipping adding the first displacement vector to the history-based displacement vector prediction list, or removing a displacement vector that is the same as the first displacement vector in the history-based displacement vector prediction list, and adding the first displacement vector to the history-based displacement vector prediction list.

13. The apparatus according to claim 10, wherein, when the processor is configured to cause the apparatus to perform obtaining the at least one candidate displacement vector, the processor is configured to cause the apparatus to perform:

constructing a history-based displacement vector prediction list, the history-based displacement vector prediction list comprising a displacement vector and auxiliary information of a historical unit in the ISC prediction mode;

classifying displacement vectors in the history-based displacement vector prediction list according to the auxiliary information;

generating a class-based displacement vector prediction list based on displacement vectors in classes; and deriving the at least one candidate displacement vector from the class-based displacement vector prediction list.

14. The apparatus according to claim 13, wherein, when the processor is configured to cause the apparatus to perform the classifying the displacement vectors in the history-based displacement vector prediction list according to the auxiliary information, the processor is configured to cause the apparatus to perform at least one of the following:

classifying the displacement vectors in the history-based displacement vector prediction list according to size information;

classifying the displacement vectors in the history-based displacement vector prediction list according to position information; or classifying the displacement vectors in the history-based displacement vector prediction list according to a quantity of duplicates.

15. The apparatus according to claim 10, wherein, when the processor is configured to cause the apparatus to perform obtaining the at least one candidate displacement vector, the processor is configured to cause the apparatus to perform:

obtaining a displacement vector of an adjacent unit of the current unit in the ISC prediction mode as the at least one candidate displacement vector.

16. The apparatus according to claim 15, wherein, when the processor is configured to cause the apparatus to perform obtaining the displacement vector of the adjacent unit of the current unit in the ISC prediction mode as the at least one candidate displacement vector, the processor is configured to cause the apparatus to perform any one of the following manners:

deriving a string vector of a string comprising position information of the current unit in the adjacent unit;

deriving a string vector of a string of which a length is greater than a preset threshold in the adjacent unit;

deriving a string vector of a string with a maximum length in the adjacent unit;

deriving a string vector of a first string or a last string in the adjacent unit; or deriving string vectors of all strings in the adjacent unit.

17. The apparatus according to claim 10, wherein, when the processor is configured to cause the apparatus to perform obtaining the at least one candidate displacement vector, the processor is configured to cause the apparatus to perform:

obtaining a preset displacement vector related to the ISC prediction mode as the at least one candidate displacement vector.

18. The apparatus according to claim 17, wherein:

in response to the prediction mode of the current unit being the IBC prediction mode, the candidate displacement vector comprises at least one of the following preset displacement vectors: $(-w, -h)$, $(-w, 0)$, $(0, -h)$, $(-2*w, 0)$, or $(0, -2*h)$, wherein w is a width of the current unit and h is a height of the current unit.

19. A non-transitory computer-readable storage medium, storing computer-readable instructions, wherein, the computer-readable instructions, when executed by a processor, are configured to cause the processor to perform:

determining a prediction mode of a current unit, the prediction mode indicating an intra block copy (IBC) prediction mode;

obtaining at least one candidate displacement vector based on at least one of: a history-based displacement vector prediction list, a class-based displacement vector prediction list, a displacement vector of an adjacent unit of the current unit, or a preset displacement vector, the at least one candidate displacement vector related to an intra string copy (ISC) prediction mode;

deriving a predicted displacement vector of the current unit from the at least one candidate displacement vector; and decoding the current unit based on the predicted displacement vector.

20. The non-transitory computer-readable storage medium according to claim 19, wherein, when the computer-readable instructions are configured to cause the processor to perform obtaining the at least one candidate displacement vector, the computer-readable instructions are configured to cause the processor to perform:

constructing a history-based displacement vector prediction list, the history-based displacement vector prediction list comprising a displacement vector of a historical unit in the ISC prediction mode; and deriving the at least one candidate displacement vector from the history-based displacement vector prediction list.

* * * * *